US009408134B2

(12) United States Patent
Anchan et al.

(10) Patent No.: US 9,408,134 B2
(45) Date of Patent: Aug. 2, 2016

(54) PROVIDING GROUP CALL PRIORITY ACCESS IN LTE AND PRIORITY ACCESS FOR USER EQUIPMENTS WITH DUAL ACCESS CLASSES

(71) Applicant: QUALCOMM Incorporated, San Diego, CA (US)

(72) Inventors: Kirankumar Bhoja Anchan, San Diego, CA (US); Karthika Paladugu, San Diego, CA (US); Arvind Vardarajan Santhanam, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 0 days.

(21) Appl. No.: 14/793,672

(22) Filed: Jul. 7, 2015

(65) Prior Publication Data
US 2015/0312843 A1 Oct. 29, 2015

Related U.S. Application Data

(62) Division of application No. 14/012,931, filed on Aug. 28, 2013, now Pat. No. 9,107,183.

(60) Provisional application No. 61/695,780, filed on Aug. 31, 2012.

(51) Int. Cl.
*H04W 72/00* (2009.01)
*H04W 48/02* (2009.01)
(Continued)

(52) U.S. Cl.
CPC .............. *H04W 48/02* (2013.01); *H04M 3/00* (2013.01); *H04W 48/08* (2013.01); *H04W 48/16* (2013.01); *H04W 74/00* (2013.01); *H04W 4/08* (2013.01); *H04W 12/08* (2013.01)

(58) Field of Classification Search
CPC ..... H04W 48/02; H04W 48/16; H04W 48/08; H04W 74/00; H04W 4/08; H04W 12/08; H04M 3/00

USPC ............ 455/452.1, 452.2, 454, 442
See application file for complete search history.

(56) References Cited

U.S. PATENT DOCUMENTS 8,134,953 B2  3/2012 Mooney et al.
2008/0032695 A1  2/2008 Zhu et al.
(Continued)

FOREIGN PATENT DOCUMENTS

CN  1113406 A  12/1995
CN  101060560 A  10/2007
(Continued)

OTHER PUBLICATIONS

Huawei et al., "Discussion on implementing dual access priority", 3GPP Draft; C1-122081_Discussion on Implementing Dual Access Priority, 3rd Generation Partnership Project (3GPP), Mobile Competence Centre; 650, Route Des Lucioles; F-06921 Sophia-Antipolis Cedex; France, vol. CT WG1, No. Kyoto; May 21, 2012-May 25, 2012, May 14, 2012, pp. 1-6, XP050588268.
(Continued)

*Primary Examiner* — Khai M Nguyen
(74) *Attorney, Agent, or Firm* — Muncy, Geissler, Olds & Lowe, P.C.

(57) ABSTRACT

The disclosure relates to determining priority access with dual access barring classes. An aspect receives, at a client device, at least one high priority access barring class and at least one low priority access barring class, switches to the low priority access barring class, receives an access barring message, and switches to the high priority access barring class in response to receiving the access barring message. An aspect receives a call request for a high priority call among a group of client devices, transmits a notification to a network instructing it to transmit an access barring message in response to receiving the call request, wherein one or more members of the group of client devices switch to a high priority access class in response to receiving the access barring message, and suppresses call announcements for non-priority call requests after transmitting the notification.

28 Claims, 14 Drawing Sheets

(51) Int. Cl.
*H04W 74/00* (2009.01)
*H04W 48/16* (2009.01)
*H04M 3/00* (2006.01)
*H04W 48/08* (2009.01)
*H04W 4/08* (2009.01)
*H04W 12/08* (2009.01)

(56) References Cited

U.S. PATENT DOCUMENTS

| | | |
|---|---|---|
| 2010/0248680 A1 | 9/2010 | Agulnik et al. |
| 2011/0199898 A1 | 8/2011 | Cho et al. |
| 2011/0201307 A1 | 8/2011 | Segura |
| 2011/0235558 A1 | 9/2011 | Diachina et al. |
| 2011/0270984 A1 | 11/2011 | Park |
| 2012/0170503 A1 | 7/2012 | Kelley et al. |
| 2013/0051326 A1* | 2/2013 | Jeyatharan ............ H04L 47/245 370/328 |
| 2013/0130688 A1* | 5/2013 | Chin ..................... H04W 36/22 455/436 |
| 2013/0148574 A1 | 6/2013 | Liu et al. |
| 2013/0225190 A1* | 8/2013 | Aoyagi ................. H04M 3/436 455/452.1 |
| 2013/0250758 A1* | 9/2013 | Chen ..................... H04W 48/06 370/230 |
| 2014/0066082 A1 | 3/2014 | Anchan et al. |
| 2015/0006710 A1* | 1/2015 | Sauerwald ............ H04L 67/125 709/224 |

FOREIGN PATENT DOCUMENTS

| | | |
|---|---|---|
| CN | 101212724 A | 7/2008 |
| CN | 101669389 A | 3/2010 |
| CN | 102137337 A | 7/2011 |
| GB | 2465192 A | 5/2010 |
| GB | 2465192 B | 3/2011 |
| WO | 9940749 A1 | 8/1999 |
| WO | 9944379 A1 | 9/1999 |
| WO | 2007141279 A1 | 12/2007 |
| WO | 2008096162 A1 | 8/2008 |
| WO | 2009099356 A1 | 8/2009 |

OTHER PUBLICATIONS

International Search Report and Written Opinion—PCT/US2013/057392—ISA/EPO—Apr. 2, 2014.

* cited by examiner

US 9,408,134 B2

PROVIDING GROUP CALL PRIORITY ACCESS IN LTE AND PRIORITY ACCESS FOR USER EQUIPMENTS WITH DUAL ACCESS CLASSES

CLAIM OF PRIORITY UNDER 35 U.S.C. §119

The present Application for Patent is a divisional application of U.S. application Ser. No. 14/012,931, entitled "PROVIDING GROUP CALL PRIORITY ACCESS IN LTE AND PRIORITY ACCESS FOR USER EQUIPMENTS WITH DUAL ACCESS CLASSES," filed Aug. 28, 2013, which claims priority to Provisional Application No. 61/695,780, entitled "PROVIDING GROUP CALL PRIORITY ACCESS IN LTE AND PRIORITY ACCESS FOR USER EQUIPMENTS WITH DUAL ACCESS CLASSES," filed Aug. 31, 2012, and which are assigned to the assignee hereof and hereby expressly incorporated by reference herein.

BACKGROUND

1. Field of the Invention

Embodiments of the invention relate to providing group call priority access in Long Term Evolution (LTE) and priority access for user equipments (UEs) with dual access classes.

2. Description of the Related Art

Wireless communication systems have developed through various generations, including a first-generation analog wireless phone service (1G), a second-generation (2G) digital wireless phone service (including interim 2.5G and 2.75G networks) and third-generation (3G) and fourth-generation (4G) high speed data/Internet-capable wireless services. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

More recently, Long Term Evolution (LTE) has been developed as a wireless communications protocol for wireless communication of high-speed data for mobile phones and other data terminals. LTE is based on GSM, and includes contributions from various GSM-related protocols such as Enhanced Data rates for GSM Evolution (EDGE), and Universal Mobile Telecommunications System (UMTS) protocols such as High-Speed Packet Access (HSPA).

A cellular system may support broadcast, multicast, and unicast services. A broadcast service is a service that may be received by all users, e.g., news broadcast. A multicast service is a service that may be received by a group of users, e.g., a subscription video service. A unicast service is a service intended for a specific user, e.g., voice call. Group communications can be implemented using either unicast, broadcast, multicast or a combination of each. As the group becomes larger it is generally more efficient to use multicast services.

Certain cellular systems offer group priority access, thereby improving the chance of high priority group members being able to access the network by reducing the access channel collision. This is achieved by preventing other low priority users from performing channel access procedures when a select high priority group call is placed.

LTE networks support access barring by broadcasting the class(es) or categories of subscribers barred from network access on a cell-by-cell basis, as indicated in the system information block (SIB) message. UEs are provisioned with one or more access classes, and if at least one access class on the UE is permitted access based on the SIB message, the UE is allowed to perform access attempts. The typical use of access class-based barring is to categorize users into two ranges: the range that is barred from access and the remaining set that is allowed access.

SUMMARY

The disclosure relates to determining priority access with dual access barring classes. A method for determining priority access with dual access barring classes includes receiving, at a client device, at least one high priority access barring class and at least one low priority access barring class, switching to the low priority access barring class, receiving an access barring message, and switching to the high priority access barring class in response to receiving the access barring message.

A method for determining priority access with dual access barring classes includes receiving a call request for a high priority call among a group of client devices, transmitting a notification to a network instructing it to transmit an access barring message in response to receiving the call request, wherein one or more members of the group of client devices switch to a high priority access class in response to receiving the access barring message, and suppressing call announcements for non-priority call requests after transmitting the notification.

An apparatus for determining priority access with dual access barring classes includes logic configured to receive, at a client device, at least one high priority access barring class and at least one low priority access barring class, logic configured to switch to the low priority access barring class, logic configured to receive an access barring message, and logic configured to switch to the high priority access barring class in response to receiving the access barring message.

An apparatus for determining priority access with dual access barring classes includes logic configured to receive a call request for a high priority call among a group of client devices, logic configured to transmit a notification to a network instructing it to transmit an access barring message in response to receiving the call request, wherein one or more members of the group of client devices switch to a high priority access class in response to receiving the access barring message, and logic configured to suppress call announcements for non-priority call requests after transmitting the notification.

An apparatus for determining priority access with dual access barring classes includes means for receiving, at a client device, at least one high priority access barring class and at least one low priority access barring class, means for switching to the low priority access barring class, means for receiving an access barring message, and means for switching to the high priority access barring class in response to receiving the access barring message.

An apparatus for determining priority access with dual access barring classes includes means for receiving a call request for a high priority call among a group of client devices, means for transmitting a notification to a network instructing it to transmit an access barring message in response to receiving the call request, wherein one or more members of the group of client devices switch to a high priority access class in response to receiving the access barring message, and means for suppressing call announcements for non-priority call requests after transmitting the notification.

A non-transitory computer-readable medium for determining priority access with dual access barring classes includes at least one instruction to receive, at a client device, at least one high priority access barring class and at least one low priority access barring class, at least one instruction to switch to the low priority access barring class, at least one instruction to receive an access barring message, and at least one instruction to switch to the high priority access barring class in response to receiving the access barring message.

A non-transitory computer-readable medium for determining priority access with dual access barring classes includes at least one instruction to receive a call request for a high priority call among a group of client devices, at least one instruction to transmit a notification to a network instructing it to transmit an access barring message in response to receiving the call request, wherein one or more members of the group of client devices switch to a high priority access class in response to receiving the access barring message, and at least one instruction to suppress call announcements for non-priority call requests after transmitting the notification.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
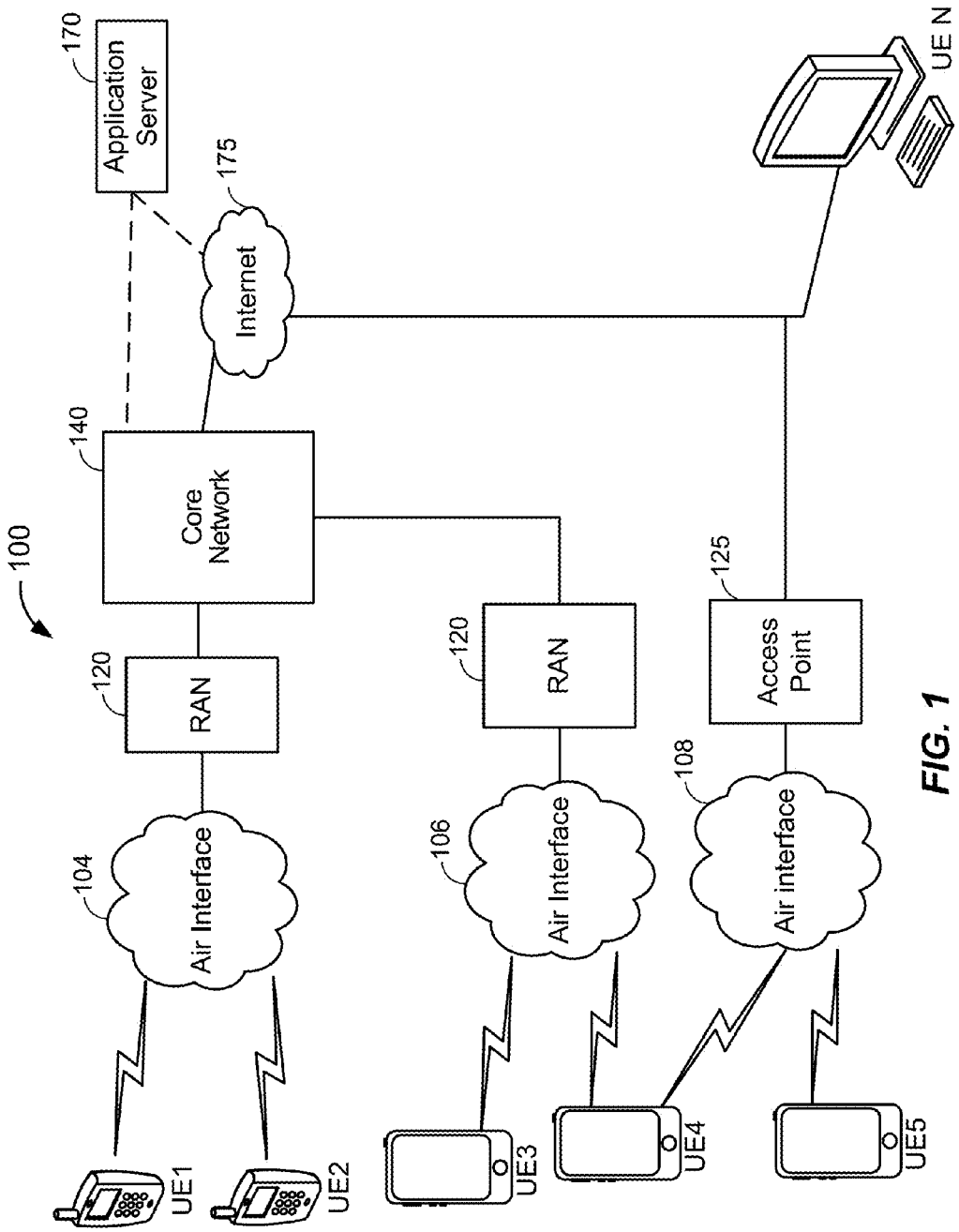
FIG. 1 illustrates a high-level system architecture of a wireless communications system in accordance with an embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A client device, referred to herein as a user equipment (UE), may be mobile or stationary, and may communicate with a radio access network (RAN). As used herein, the term "UE" may be referred to interchangeably as an "access terminal" or "AT", a "wireless device", a "subscriber device", a "subscriber terminal", a "subscriber station", a "user terminal" or UT, a "mobile terminal", a "mobile station" and variations thereof. Generally, UEs can communicate with a core network via the RAN, and through the core network the UEs can be connected with external networks such as the Internet. Of course, other mechanisms of connecting to the core network and/or the Internet are also possible for the UEs, such as over wired access networks, WiFi networks (e.g., based on IEEE 802.11, etc.) and so on. UEs can be embodied by any of a number of types of devices including but not limited to PC cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a high-level system architecture of a wireless communications system 100 in accordance with an embodiment of the invention. The wireless communications system 100 contains UEs 1 . . . N. The UEs 1 . . . N can include cellular telephones, personal digital assistant (PDAs), pagers, a laptop computer, a desktop computer, and so on. For example, in FIG. 1, UEs 1 . . . 2 are illustrated as cellular calling phones, UEs 3 . . . 5 are illustrated as cellular touchscreen phones or smart phones, and UE N is illustrated as a desktop computer or PC.

Referring to FIG. 1, UEs 1 . . . N are configured to communicate with an access network (e.g., the RAN 120, an access point 125, etc.) over a physical communications interface or layer, shown in FIG. 1 as air interfaces 104, 106, 108 and/or a direct wired connection. The air interfaces 104 and 106 can comply with a given cellular communications protocol (e.g., CDMA, EVDO, eHRPD, GSM, EDGE, W-CDMA, LTE, etc.), while the air interface 108 can comply with a wireless IP protocol (e.g., IEEE 802.11). The RAN 120 includes a plurality of access points that serve UEs over air interfaces, such as the air interfaces 104 and 106. The access points in the RAN 120 can be referred to as access nodes or ANs, access points or APs, base stations or BSs, Node Bs, eNode Bs, and so on. These access points can be terrestrial access points (or ground stations), or satellite access points. The RAN 120 is configured to connect to a core network 140 that can perform a variety of functions, including bridging circuit switched (CS) calls between UEs served by the RAN 120 and other UEs served by the RAN 120 or a different RAN altogether, and can also mediate an exchange of packet-switched (PS) data with external networks such as Internet 175. The Internet 175 includes a number of routing agents and processing agents (not shown in FIG. 1 for the sake of convenience). In FIG. 1, UE N is shown as connecting to the Internet 175 directly (i.e., separate from the core network 140, such as over an Ethernet connection of WiFi or 802.11-based network). The Internet 175 can thereby function to bridge packet-switched data communications between UE N and UEs 1 . . . N via the core network 140. Also shown in FIG. 1 is the access point 125 that is separate from the RAN 120. The access point 125 may be connected to the Internet 175 independent of the core network 140 (e.g., via an optical communication system such as FiOS, a cable modem, etc.). The air interface 108 may serve UE 4 or UE 5 over a local wireless connection, such as IEEE 802.11 in an example. UE N is shown as a desktop computer with a wired connection to the Internet 175, such as a direct connection to a modem or router, which can correspond to the access point 125 itself in an example (e.g., for a WiFi router with both wired and wireless connectivity).

Referring to FIG. 1, an application server 170 is shown as connected to the Internet 175, the core network 140, or both. The application server 170 can be implemented as a plurality of structurally separate servers, or alternately may correspond to a single server. As will be described below in more detail, the application server 170 is configured to support one or more communication services (e.g., Voice-over-Internet Protocol (VoIP) sessions, Push-to-Talk (PTT) sessions, group communication sessions, social networking services, etc.) for UEs that can connect to the application server 170 via the core network 140 and/or the Internet 175.

Examples of protocol-specific implementations for the RAN 120 and the core network 140 are provided below with respect to FIGS. 2A through 2D to help explain the wireless communications system 100 in more detail. In particular, the components of the RAN 120 and the core network 140 corresponds to components associated with supporting packet-switched (PS) communications, whereby legacy circuit-switched (CS) components may also be present in these networks, but any legacy CS-specific components are not shown explicitly in FIGS. 2A-2D.

Figure 2A:
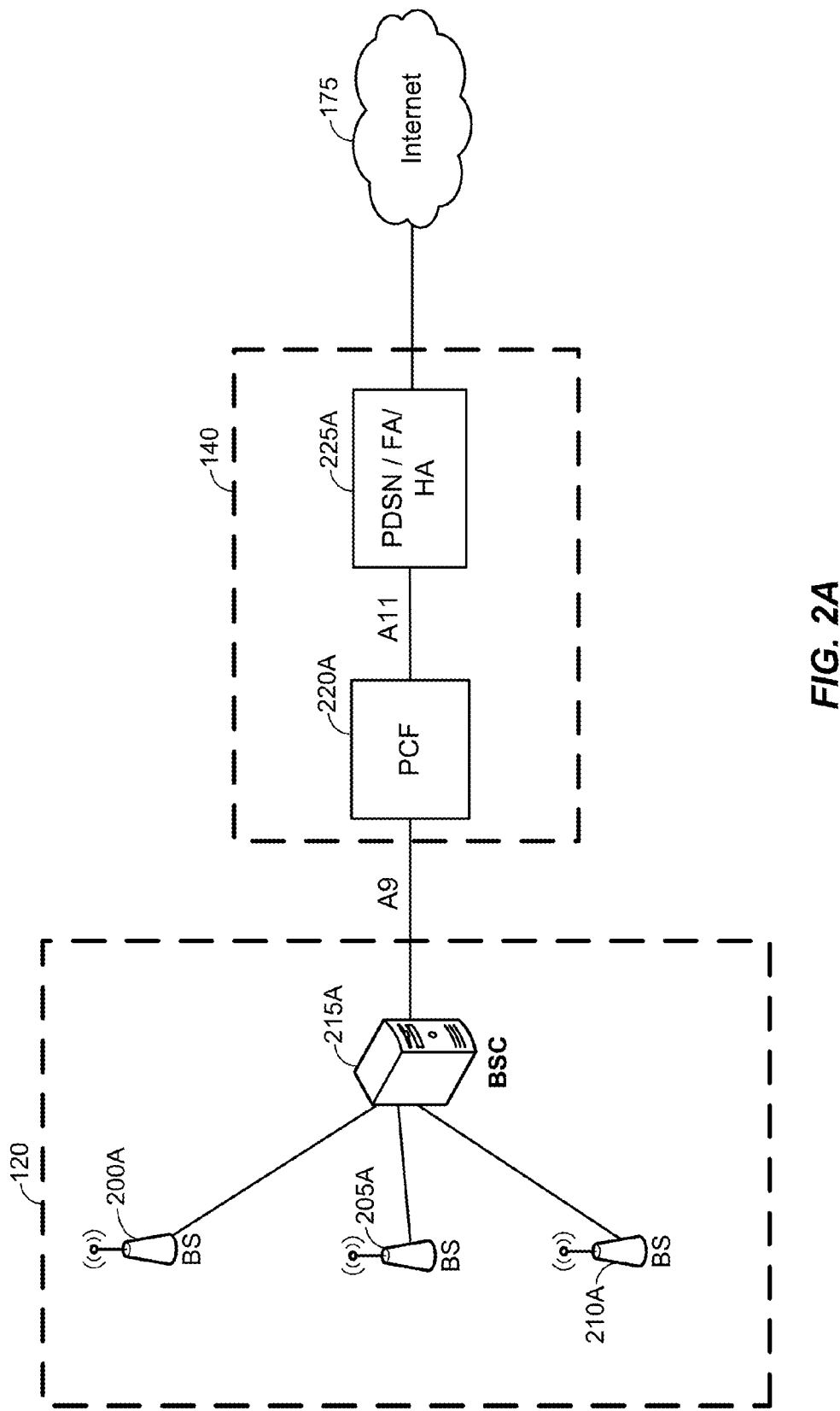
FIG. 2A illustrates an example configuration of a radio access network (RAN) and a packet-switched portion of a core network for a 1xEV-DO network in accordance with an embodiment of the invention.

FIG. 2A illustrates an example configuration of the RAN 120 and the core network 140 for packet-switched communications in a CDMA2000 1×Evolution-Data Optimized (EV-DO) network in accordance with an embodiment of the invention. Referring to FIG. 2A, the RAN 120 includes a plurality of base stations (BSs) 200A, 205A and 210A that are coupled to a base station controller (BSC) 215A over a wired backhaul interface. A group of BSs controlled by a single BSC is collectively referred to as a subnet. As will be appreciated by one of ordinary skill in the art, the RAN 120 can include multiple BSCs and subnets, and a single BSC is shown in FIG. 2A for the sake of convenience. The BSC 215A communicates with a packet control function (PCF) 220A within the core network 140 over an A9 connection. The PCF 220A performs certain processing functions for the BSC 215A related to packet data. The PCF 220A communicates with a Packet Data Serving Node (PDSN) 225A within the core network 140 over an A11 connection. The PDSN 225A has a variety of functions, including managing Point-to-Point (PPP) sessions, acting as a home agent (HA) and/or foreign agent (FA), and is similar in function to a Gateway General Packet Radio Service (GPRS) Support Node (GGSN) in GSM and UMTS networks (described below in more detail). The PDSN 225A connects the core network 140 to external IP networks, such as the Internet 175.

Figure 2B:
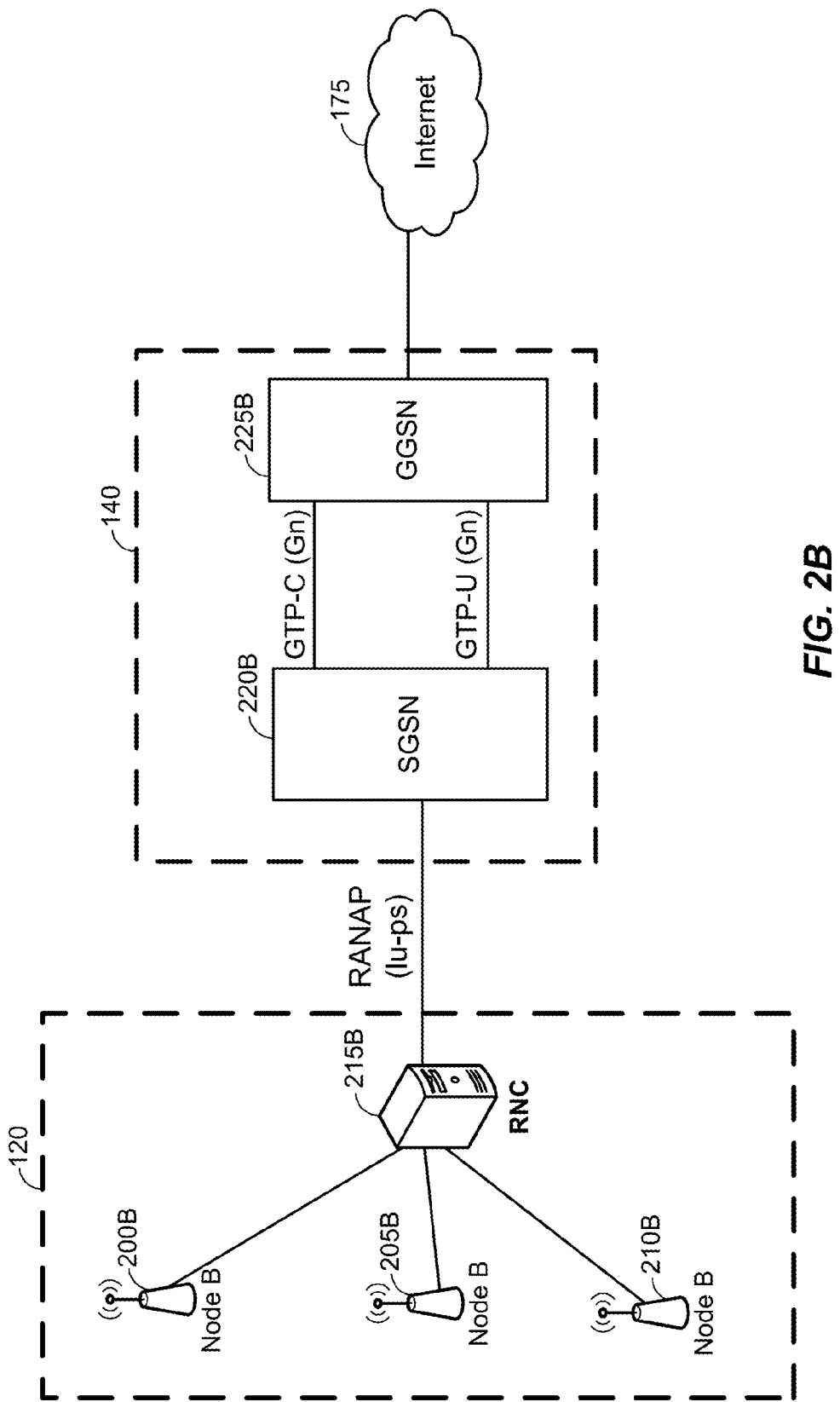
FIG. 2B illustrates an example configuration of the RAN and a packet-switched portion of a General Packet Radio Service (GPRS) core network within a 3G UMTS W-CDMA system in accordance with an embodiment of the invention.

FIG. 2B illustrates an example configuration of the RAN 120 and a packet-switched portion of the core network 140 that is configured as a GPRS core network within a 3G UMTS W-CDMA system in accordance with an embodiment of the invention. Referring to FIG. 2B, the RAN 120 includes a plurality of Node Bs 200B, 205B and 210B that are coupled to a Radio Network Controller (RNC) 215B over a wired backhaul interface. Similar to 1×EV-DO networks, a group of Node Bs controlled by a single RNC is collectively referred to as a subnet. As will be appreciated by one of ordinary skill in the art, the RAN 120 can include multiple RNCs and subnets, and a single RNC is shown in FIG. 2B for the sake of convenience. The RNC 215B is responsible for signaling, establishing and tearing down bearer channels (i.e., data channels) between a Serving GRPS Support Node (SGSN) 220B in the core network 140 and UEs served by the RAN 120. If link layer encryption is enabled, the RNC 215B also encrypts the content before forwarding it to the RAN 120 for transmission over an air interface. The function of the RNC 215B is well-known in the art and will not be discussed further for the sake of brevity.

In FIG. 2B, the core network 140 includes the above-noted SGSN 220B (and potentially a number of other SGSNs as well) and a GGSN 225B. Generally, GPRS is a protocol used in GSM for routing IP packets. The GPRS core network (e.g., the GGSN 225B and one or more SGSNs 220B) is the centralized part of the GPRS system and also provides support for W-CDMA based 3G access networks. The GPRS core network is an integrated part of the GSM core network (i.e., the core network 140) that provides mobility management, session management and transport for IP packet services in GSM and W-CDMA networks.

The GPRS Tunneling Protocol (GTP) is the defining IP protocol of the GPRS core network. The GTP is the protocol which allows end users (e.g., UEs) of a GSM or W-CDMA network to move from place to place while continuing to connect to the Internet 175 as if from one location at the GGSN 225B. This is achieved by transferring the respective UE's data from the UE's current SGSN 220B to the GGSN 225B, which is handling the respective UE's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2B, the GGSN 225B acts as an interface between a GPRS backbone network (not shown) and the Internet 175. The GGSN 225B extracts packet data with associated a packet data protocol (PDP) format (e.g., IP or PPP) from GPRS packets coming from the SGSN 220B, and sends the packets out on a corresponding packet data network. In the other direction, the incoming data packets are directed by the GGSN connected UE to the SGSN 220B which manages and controls the Radio Access Bearer (RAB) of a target UE served by the RAN 120. Thereby, the GGSN 225B stores the current SGSN address of the target UE and its associated profile in a location register (e.g., within a PDP context). The GGSN 225B is responsible for IP address assignment and is the default router for a connected UE. The GGSN 225B also performs authentication and charging functions.

The SGSN 220B is representative of one of many SGSNs within the core network 140, in an example. Each SGSN is responsible for the delivery of data packets from and to the UEs within an associated geographical service area. The tasks of the SGSN 220B includes packet routing and transfer, mobility management (e.g., attach/detach and location management), logical link management, and authentication and charging functions. The location register of the SGSN 220B stores location information (e.g., current cell, current VLR) and user profiles (e.g., IMSI, PDP address(es) used in the packet data network) of all GPRS users registered with the SGSN 220B, for example, within one or more PDP contexts for each user or UE. Thus, SGSNs 220B are responsible for (i) de-tunneling downlink GTP packets from the GGSN 225B, (ii) uplink tunnel IP packets toward the GGSN 225B, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in UMTS system architecture) communicates with the SGSN 220B via a Radio Access Network Application Part (RANAP) protocol. RANAP operates over a Iu interface (Iu-ps), with a transmission protocol such as Frame Relay or IP. The SGSN 220B communicates with the GGSN 225B via a Gn interface, which is an IP-based interface between SGSN 220B and other SGSNs (not shown) and internal GGSNs (not shown), and uses the GTP protocol defined above (e.g., GTP-U, GTP-C, GTP', etc.). In the embodiment of FIG. 2B, the Gn between the SGSN 220B and the GGSN 225B carries both the GTP-C and the GTP-U. While not shown in FIG. 2B, the Gn interface is also used by the Domain Name System (DNS). The GGSN 225B is connected to a Public Data Network (PDN) (not shown), and in turn to the Internet 175, via a Gi interface with IP protocols either directly or through a Wireless Application Protocol (WAP) gateway.

Figure 2C:
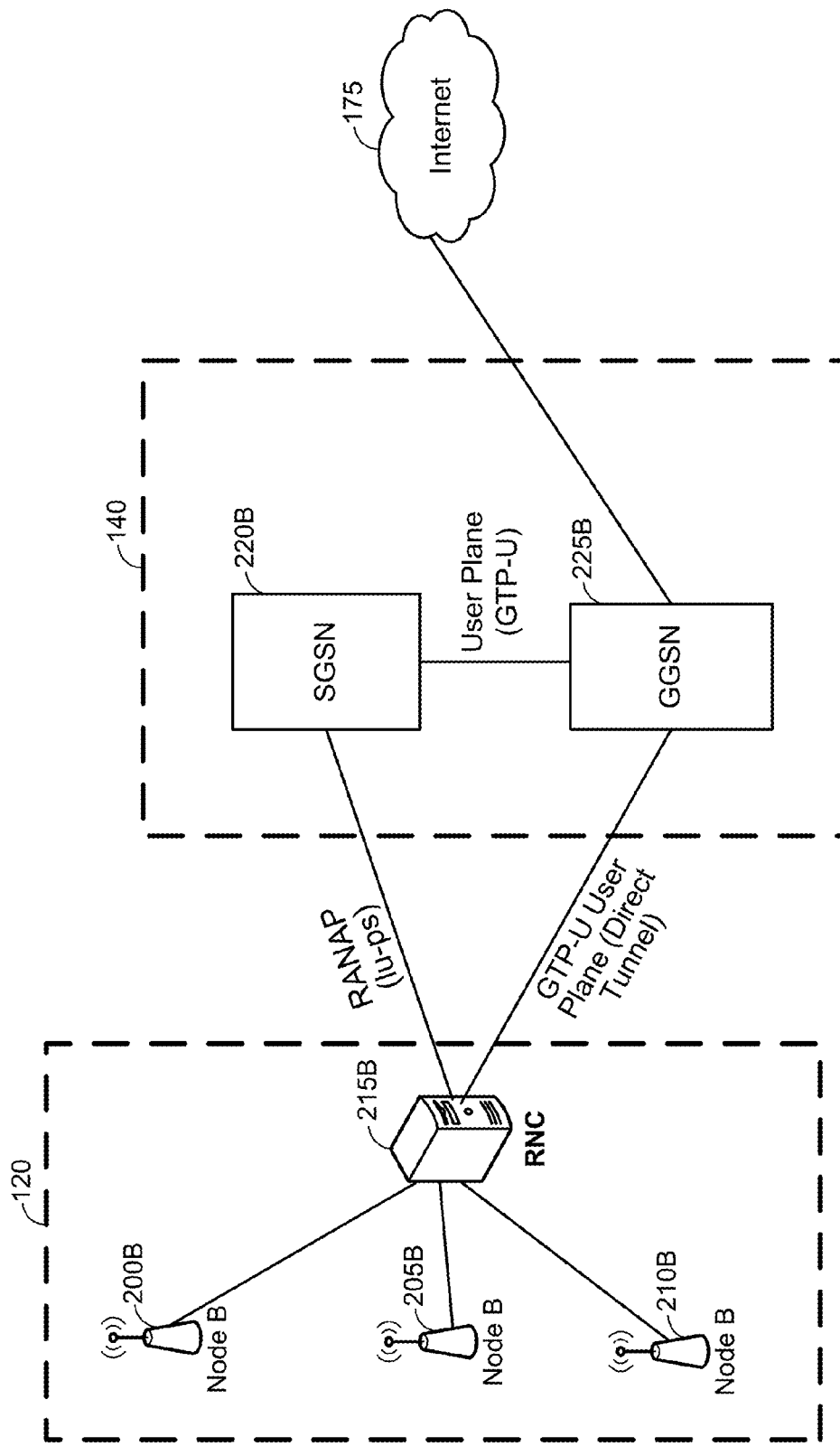
FIG. 2C illustrates another example configuration of the RAN and a packet-switched portion of a GPRS core network within a 3G UMTS W-CDMA system in accordance with an embodiment of the invention.

FIG. 2C illustrates another example configuration of the RAN 120 and a packet-switched portion of the core network 140 that is configured as a GPRS core network within a 3G UMTS W-CDMA system in accordance with an embodiment of the invention. Similar to FIG. 2B, the core network 140 includes the SGSN 220B and the GGSN 225B. However, in FIG. 2C, Direct Tunnel is an optional function in Iu mode that allows the SGSN 220B to establish a direct user plane tunnel, GTP-U, between the RAN 120 and the GGSN 225B within a PS domain. A Direct Tunnel capable SGSN, such as SGSN 220B in FIG. 2C, can be configured on a per GGSN and per RNC basis whether or not the SGSN 220B can use a direct user plane connection. The SGSN 220B in FIG. 2C handles the control plane signaling and makes the decision of when to establish Direct Tunnel. When the RAB assigned for a PDP context is released (i.e. the PDP context is preserved) the GTP-U tunnel is established between the GGSN 225B and SGSN 220B in order to be able to handle the downlink packets.

Figure 2D:
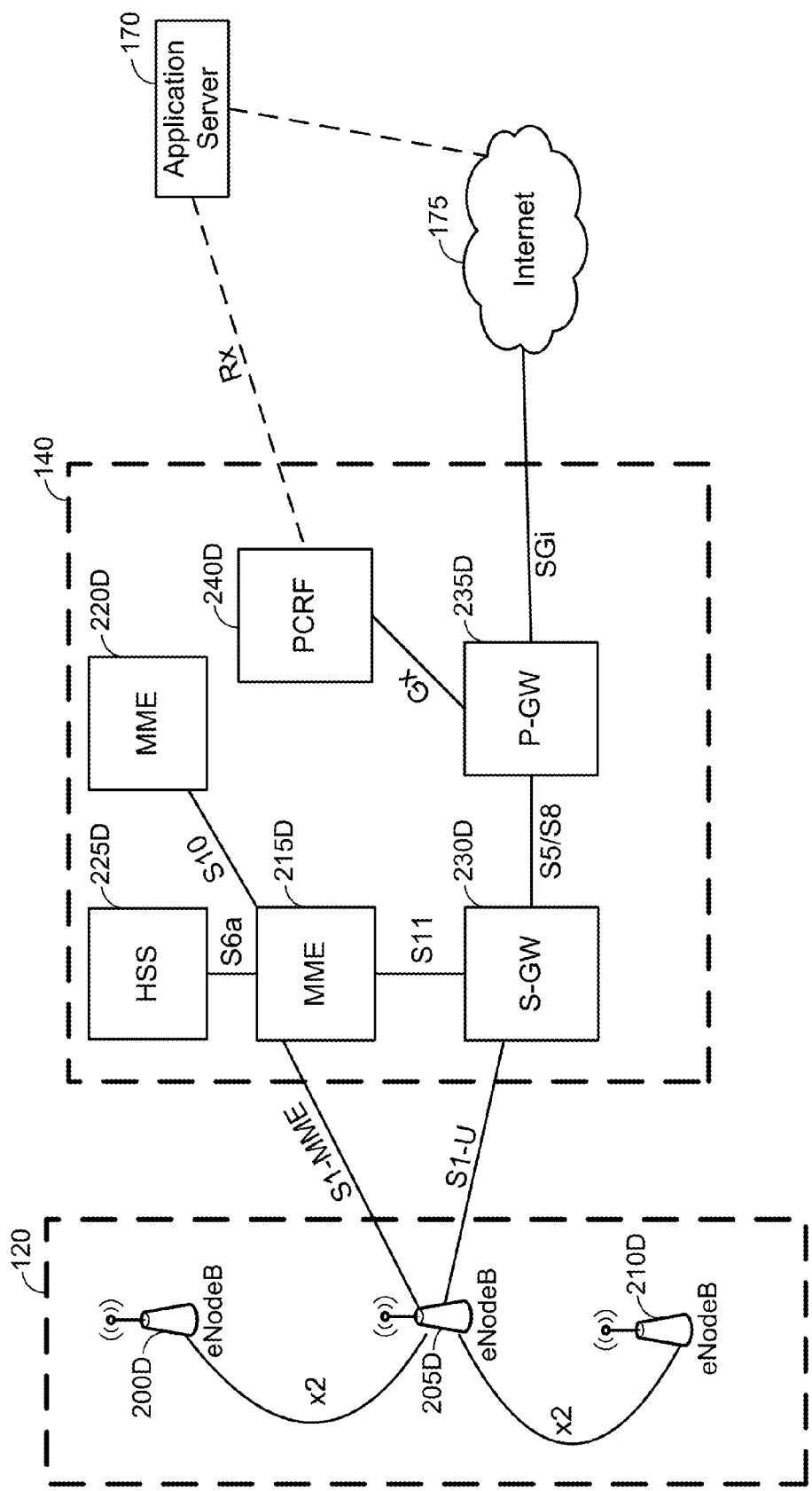
FIG. 2D illustrates an example configuration of the RAN and a packet-switched portion of the core network that is based on an Evolved Packet System (EPS) or Long Term Evolution (LTE) network in accordance with an embodiment of the invention.

FIG. 2D illustrates an example configuration of the RAN 120 and a packet-switched portion of the core network 140 based on an Evolved Packet System (EPS) or LTE network, in accordance with an embodiment of the invention. Referring to FIG. 2D, unlike the RAN 120 shown in FIGS. 2B-2C, the RAN 120 in the EPS/LTE network is configured with a plurality of Evolved Node Bs (ENodeBs or eNBs) 200D, 205D and 210D, without the RNC 215B from FIGS. 2B-2C. This is because ENodeBs in EPS/LTE networks do not require a separate controller (i.e., the RNC 215B) within the RAN 120 to communicate with the core network 140. In other words, some of the functionality of the RNC 215B from FIGS. 2B-2C is built into each respective eNodeB of the RAN 120 in FIG. 2D.

In FIG. 2D, the core network 140 includes a plurality of Mobility Management Entities (MMEs) 215D and 220D, a Home Subscriber Server (HSS) 225D, a Serving Gateway (S-GW) 230D, a Packet Data Network Gateway (P-GW) 235D and a Policy and Charging Rules Function (PCRF) 240D. Network interfaces between these components, the RAN 120 and the Internet 175 are illustrated in FIG. 2D and are defined in Table 1 (below) as follows:

TABLE 1

EPS/LTE Core Network Connection Definitions

| Network Interface | Description |
|---|---|
| S1-MME | Reference point for the control plane protocol between RAN 120 and MME 215D. |

TABLE 1-continued

EPS/LTE Core Network Connection Definitions

| Network Interface | Description |
| --- | --- |
| S1-U | Reference point between RAN 120 and S-GW 230D for the per bearer user plane tunneling and inter-eNodeB path switching during handover. |
| S5 | Provides user plane tunneling and tunnel management between S-GW 230D and P-GW 235D. It is used for S-GW relocation due to UE mobility and if the S-GW 230D needs to connect to a non-collocated P-GW for the required PDN connectivity. |
| S6a | Enables transfer of subscription and authentication data for authenticating/authorizing user access to the evolved system (Authentication, Authorization, and Accounting [AAA] interface) between MME 215D and HSS 225D. |
| Gx | Provides transfer of Quality of Service (QoS) policy and charging rules from PCRF 240D to Policy a Charging Enforcement Function (PCEF) component (not shown) in the P-GW 235D. |
| S8 | Inter-PLMN reference point providing user and control plane between the S-GW 230D in a Visited Public Land Mobile Network (VPLMN) and the P-GW 235D in a Home Public Land Mobile Network (HPLMN). S8 is the inter-PLMN variant of S5. |
| S10 | Reference point between MMEs 215D and 220D for MME relocation and MME to MME information transfer. |
| S11 | Reference point between MME 215D and S-GW 230D. |
| SGi | Reference point between the P-GW 235D and the packet data network, shown in FIG. 2D as the Internet 175. The Packet data network may be an operator external public or private packet data network or an intra-operator packet data network (e.g., for provision of IMS services). This reference point corresponds to Gi for 3GPP accesses. |
| X2 | Reference point between two different eNodeBs used for UE handoffs. |
| Rx | Reference point between the PCRF 240D and an application function (AF) that is used to exchanged application-level session information, where the AF is represented in FIG. 1 by the application server 170. |

A high-level description of the components shown in the RAN 120 and core network 140 of FIG. 2D will now be described. However, these components are each well-known in the art from various 3GPP TS standards, and the description contained herein is not intended to be an exhaustive description of all functionalities performed by these components.

Referring to FIG. 2D, the MMEs 215D and 220D are configured to manage the control plane signaling for the EPS bearers. MME functions include: Non-Access Stratum (NAS) signaling, NAS signaling security, Mobility management for inter- and intra-technology handovers, P-GW and S-GW selection, and MME selection for handovers with MME change.

Referring to FIG. 2D, the S-GW 230D is the gateway that terminates the interface toward the RAN 120. For each UE associated with the core network 140 for an EPS-based system, at a given point of time, there is a single S-GW. The functions of the S-GW 230D, for both the GTP-based and the Proxy Mobile IPv6 (PMIP)-based S5/S8, include: Mobility anchor point, Packet routing and forwarding, and setting the DiffSery Code Point (DSCP) based on a QoS Class Identifier (QCI) of the associated EPS bearer.

Referring to FIG. 2D, the P-GW 235D is the gateway that terminates the SGi interface toward the Packet Data Network (PDN), e.g., the Internet 175. If a UE is accessing multiple PDNs, there may be more than one P-GW for that UE; however, a mix of S5/S8 connectivity and Gn/Gp connectivity is not typically supported for that UE simultaneously. P-GW functions include for both the GTP-based S5/S8: Packet filtering (by deep packet inspection), UE IP address allocation, setting the DSCP based on the QCI of the associated EPS bearer, accounting for inter operator charging, uplink (UL) and downlink (DL) bearer binding as defined in 3GPP TS 23.203, UL bearer binding verification as defined in 3GPP TS 23.203. The P-GW 235D provides PDN connectivity to both GSM/EDGE Radio Access Network (GERAN)/UTRAN only UEs and E-UTRAN-capable UEs using any of E-UTRAN, GERAN, or UTRAN. The P-GW 235D provides PDN connectivity to E-UTRAN capable UEs using E-UTRAN only over the S5/S8 interface.

Referring to FIG. 2D, the PCRF 240D is the policy and charging control element of the EPS-based core network 140. In a non-roaming scenario, there is a single PCRF in the HPLMN associated with a UE's Internet Protocol Connectivity Access Network (IP-CAN) session. The PCRF terminates the Rx interface and the Gx interface. In a roaming scenario with local breakout of traffic, there may be two PCRFs associated with a UE's IP-CAN session: A Home PCRF (H-PCRF) is a PCRF that resides within a HPLMN, and a Visited PCRF (V-PCRF) is a PCRF that resides within a visited VPLMN. PCRF is described in more detail in 3GPP TS 23.203, and as such will not be described further for the sake of brevity. In FIG. 2D, the application server 170 (e.g., which can be referred to as the AF in 3GPP terminology) is shown as connected to the core network 140 via the Internet 175, or alternatively to the PCRF 240D directly via an Rx interface. Generally, the application server 170 (or AF) is an element offering applications that use IP bearer resources with the core network (e.g. UMTS PS domain/GPRS domain resources/LTE PS data services). One example of an application function is the Proxy-Call Session Control Function (P-CSCF) of the IP Multimedia Subsystem (IMS) Core Network sub system. The AF uses the Rx reference point to provide session information to the PCRF 240D. Any other application server offering IP data services over cellular network can also be connected to the PCRF 240D via the Rx reference point.

In LTE, data and overhead information are processed as logical channels at a Radio Link Control (RLC) layer. The logical channels are mapped to transport channels at a Medium Access Control (MAC) layer. The transport channels are mapped to physical channels at a physical layer (PHY). Table 2 lists some logical channels (denoted as "L"), transport channels (denoted as "T"), and physical channels (denoted as "P") used in LTE and provides a short description for each channel.

TABLE 2

Logical and Physical Channels Used in LTE

| Name | Channel | Type | Description |
|---|---|---|---|
| Broadcast Control Channel | BCCH | L | Carry system information |
| Broadcast Channel | BCH | T | Carry master system Information |
| eMBMS Traffic Channel | MTCH | L | Carry configuration information for eMBMS services. |
| Multicast Channel | MCH | T | Carry the MTCH and MCCH |
| Downlink Shared Channel | DL-SCH | T | Carry the MTCH and other logical channels |
| Physical Broadcast Channel | PBCH | P | Carry basic system information for use in acquiring the system. |
| Physical Multicast Channel | PMCH | P | Carry the MCH. |
| Physical Downlink Shared Channel | PDSCH | P | Carry data for the DL-SCH |
| Physical Downlink Control Channel | PDCCH | P | Carry control information for the DL-SCH |

As shown in Table 2, different types of overhead information may be sent on different channels. Table 3 lists some types of overhead information and provides a short description for each type. Table 3 also gives the channel(s) on which each type of overhead information may be sent, in accordance with one design.

TABLE 3

Types of Overhead Information

| Overhead Information | Channel | Description |
|---|---|---|
| System Information | BCCH | Information pertinent for communicating with and/or receiving data from the system. |
| Configuration Information | MCCH | Information used to receive the Information services, e.g., MBSFN Area Configuration, which contains PMCH configurations, Service ID, Session ID, etc. |
| Control Information | PDCCH | Information used to receive Information transmissions of data for the services, e.g., resource assignments, modulation and coding schemes, etc. |

The different types of overhead information may also be referred to by other names. The scheduling and control information may be dynamic whereas the system and configuration information may be semi-static.

System information is provided by Radio Resource Control (RRC) function, and is structured in master information blocks (MIBs) and system information blocks (SIBs). A MIB is transmitted in fixed location time slots and includes parameters to aid the UE in locating the SIB Type 1 (SIB1) scheduled on the DL-SCH (e.g., DL bandwidth and system frame number). The SIB1 contains information relevant to scheduling the other system information and information on access to a cell. The other SIBs are multiplexed in System Information Messages. A SIB Type 2 (SIB2) message contains resource configuration information that is common for all UEs and information on access barring. The evolved universal terrestrial RAN (E-UTRAN) controls user access by broadcasting access class barring parameters in a SIB2 message, and the UE performs actions according to the access class in its universal subscriber identity module (USIM).

All UEs that are members of access classes one to ten are randomly allocated mobile populations, defined as access classes 0 to 9. The population number is stored in the SIM/USIM. In addition, UEs may be members of one or more of five special categories (access classes 11 to 15) also held in the SIM/USIM. The standard (3GPP TS 22.011, section 4.2) defines these access classes as follows:
  Class 15—PLMN Staff;
  Class 14—Emergency Services;
  Class 13—Public Utilities (e.g. water/gas suppliers);
  Class 12—Security Services;
  Class 11—For PLMN Use
A SIB2 message contains the following parameters for access control:
  For regular users with access class 0-9, the access is controlled by ac-BarringFactor and ac-BarringTime parameters in the SIB2 message.
  For users initiating emergency calls (access class 10) the access is controlled by the ac-BarringForEmergency parameter, which indicates whether access barring is enforced or not enforced.
  For UEs with access class 11 to 15, access is controlled by the ac-BarringForSpecialAC parameter, which indicates whether access barring is enforced or not enforced.

A UE is allowed to perform access procedures when the UE is a member of at least one access class that corresponds to the permitted classes, as signaled over the air interface. The UEs generates a random number to pass the "persistent" test in order for the UE to gain access. To gain access, a UE random number generator's outcome needs to be lower than the threshold set in the ac-BarringFactor. By setting the ac-BarringFactor to a lower value, the access from regular users is restricted. The users with access class 11 to 15 can gain access without any restriction.

Figure 2E:
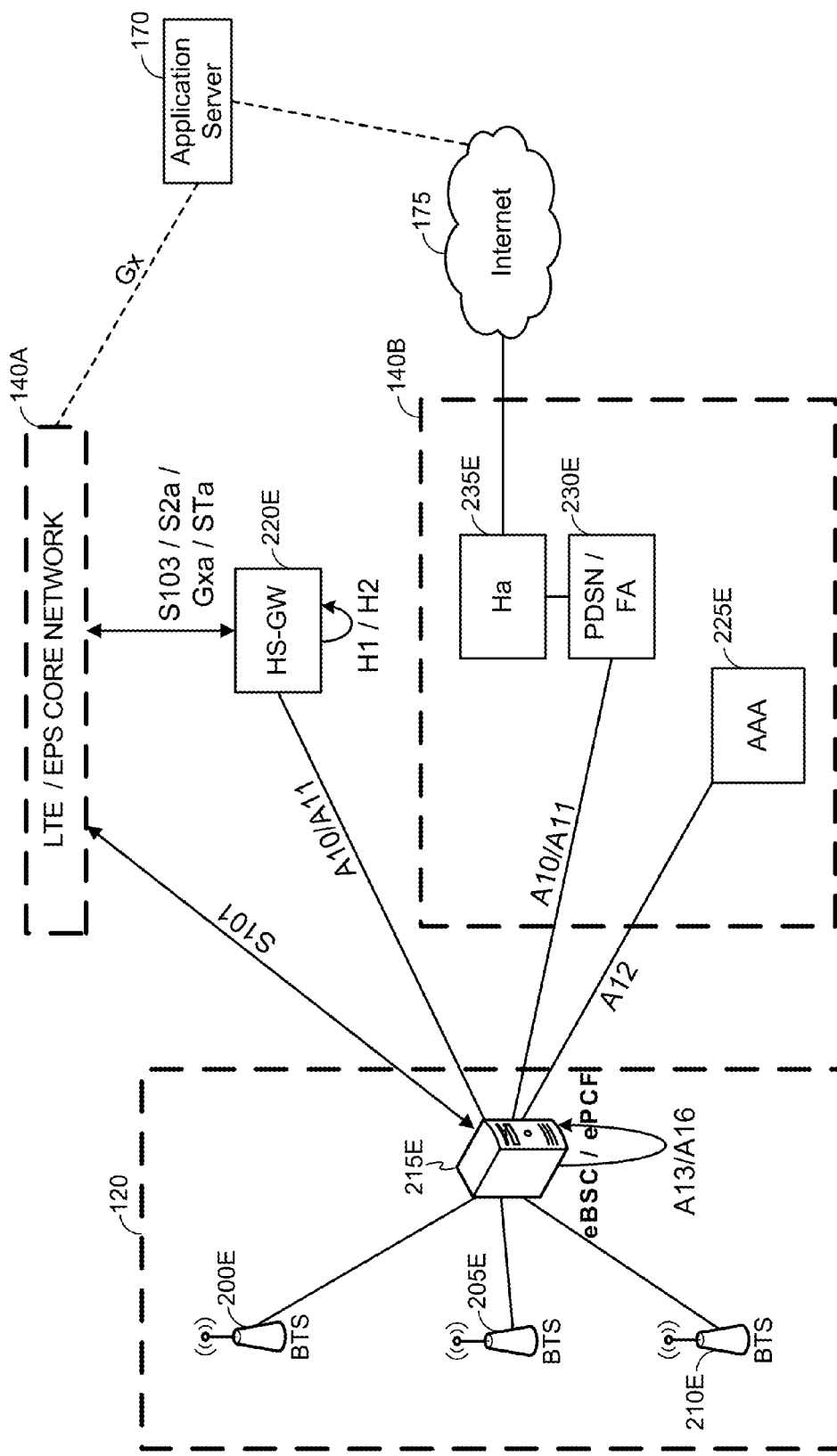
FIG. 2E illustrates an example configuration of an enhanced High Rate Packet Data (HRPD) RAN connected to an EPS or LTE network and also a packet-switched portion of an HRPD core network in accordance with an embodiment of the invention.

FIG. 2E illustrates an example of the RAN 120 configured as an enhanced High Rate Packet Data (HRPD) RAN connected to an EPS or LTE network 140A and also a packet-switched portion of an HRPD core network 140B in accordance with an embodiment of the invention. The core network 140A is an EPS or LTE core network, similar to the core network described above with respect to FIG. 2D.

In FIG. 2E, the eHRPD RAN includes a plurality of base transceiver stations (BTSs) 200E, 205E and 210E, which are connected to an enhanced BSC (eBSC) and enhanced PCF (ePCF) 215E. The eBSC/ePCF 215E can connect to one of the MMEs 215D or 220D within the EPS core network 140A over an S101 interface, and to an HRPD serving gateway (HSGW) 220E over A10 and/or A11 interfaces for interfacing with other entities in the EPS core network 140A (e.g., the S-GW 220D over an S103 interface, the P-GW 235D over an S2a interface, the PCRF 240D over a Gxa interface, a 3GPP AAA server (not shown explicitly in FIG. 2D) over an STa interface, etc.). The HSGW 220E is defined in 3GPP2 to provide the interworking between HRPD networks and EPS/LTE networks. As will be appreciated, the eHRPD RAN and the HSGW 220E are configured with interface functionality to EPC/LTE networks that is not available in legacy HRPD networks.

Turning back to the eHRPD RAN, in addition to interfacing with the EPS/LTE network 140A, the eHRPD RAN can also interface with legacy HRPD networks such as HRPD network 140B. As will be appreciated the HRPD network 140B is an example implementation of a legacy HRPD network, such as the EV-DO network from FIG. 2A. For example, the eBSC/ePCF 215E can interface with an authentication, authorization and accounting (AAA) server 225E via an A12 interface, or to a PDSN/FA 230E via an A10 or A11 interface. The PDSN/FA 230E in turn connects to HA 235A, through which the Internet 175 can be accessed. In FIG. 2E, certain interfaces (e.g., A13, A16, H1, H2, etc.) are not described explicitly but are shown for completeness and would be understood by one of ordinary skill in the art familiar with HRPD or eHRPD.

Referring to FIGS. 2B-2E, it will be appreciated that LTE core networks (e.g., FIG. 2D) and HRPD core networks that interface with eHRPD RANs and HSGWs (e.g., FIG. 2E) can support network-initiated Quality of Service (QoS) (e.g., by the P-GW, GGSN, SGSN, etc.) in certain cases.

Figure 3:
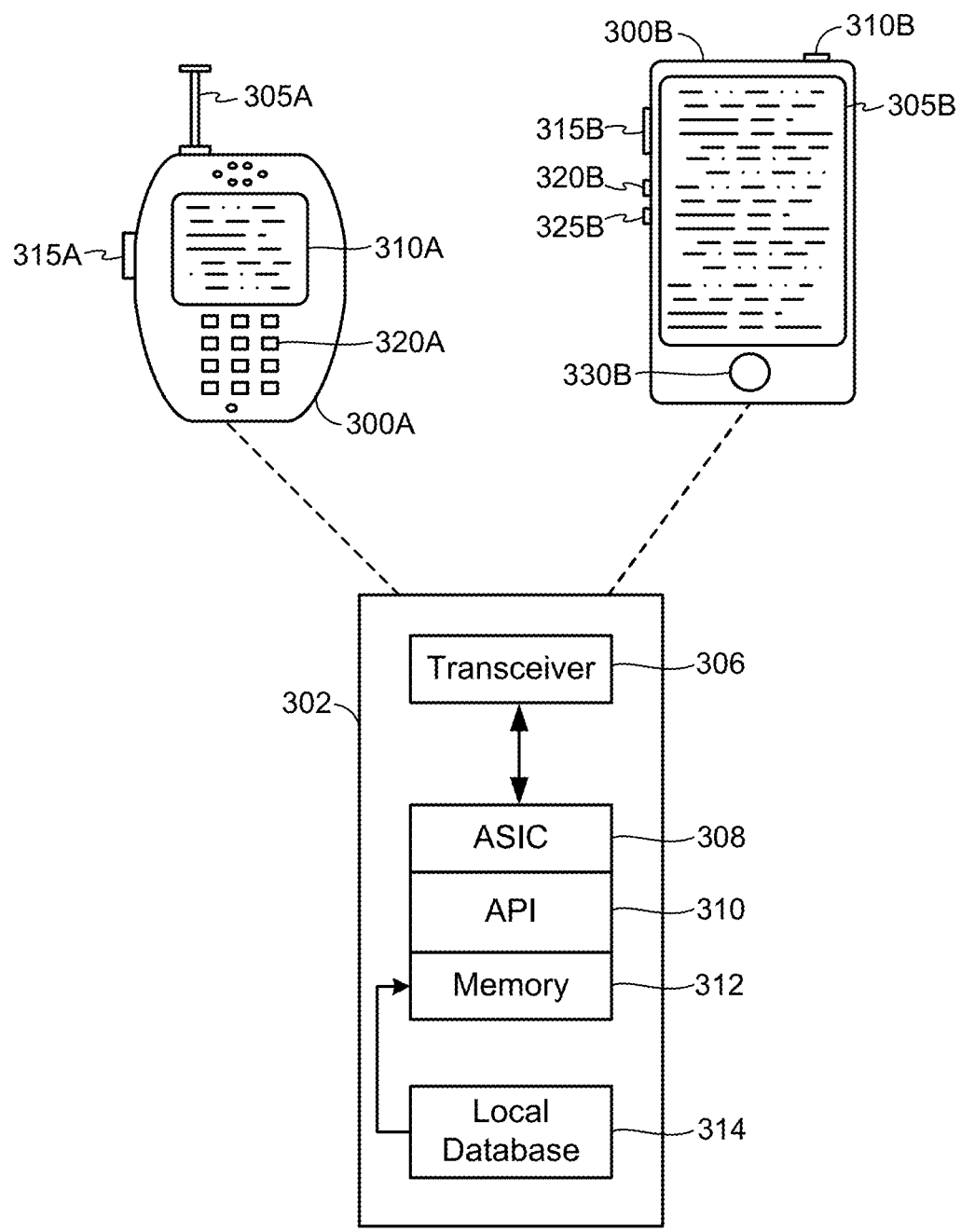
FIG. 3 illustrates examples of user equipments (UEs) in accordance with embodiments of the invention.

FIG. 3 illustrates examples of UEs in accordance with embodiments of the invention. Referring to FIG. 3, UE 300A is illustrated as a calling telephone and UE 300B is illustrated as a touchscreen device (e.g., a smart phone, a tablet computer, etc.). As shown in FIG. 3, an external casing of UE 300A is configured with an antenna 305A, display 310A, at least one button 315A (e.g., a PTT button, a power button, a volume control button, etc.) and a keypad 320A among other components, as is known in the art. Also, an external casing of UE 300B is configured with a touchscreen display 305B, peripheral buttons 310B, 315B, 320B and 325B (e.g., a power control button, a volume or vibrate control button, an airplane mode toggle button, etc.), at least one front-panel button 330B (e.g., a Home button, etc.), among other components, as is known in the art. While not shown explicitly as part of UE 300B, the UE 300B can include one or more external antennas and/or one or more integrated antennas that are built into the external casing of UE 300B, including but not limited to WiFi antennas, cellular antennas, satellite position system (SPS) antennas (e.g., global positioning system (GPS) antennas), and so on.

While internal components of UEs such as the UEs 300A and 300B can be embodied with different hardware configurations, a basic high-level UE configuration for internal hardware components is shown as platform 302 in FIG. 3. The platform 302 can receive and execute software applications, data and/or commands transmitted from the RAN 120 that may ultimately come from the core network 140, the Internet 175 and/or other remote servers and networks (e.g., application server 170, web URLs, etc.). The platform 302 can also independently execute locally stored applications without RAN interaction. The platform 302 can include a transceiver 306 operably coupled to an application specific integrated circuit (ASIC) 308, or other processor, microprocessor, logic circuit, or other data processing device. The ASIC 308 or other processor executes the application programming interface (API) 310 layer that interfaces with any resident programs in the memory 312 of the wireless device. The memory 312 can be comprised of read-only or random-access memory (RAM and ROM), EEPROM, flash cards, or any memory common to computer platforms. The platform 302 also can include a local database 314 that can store applications not actively used in memory 312, as well as other data. The local database 314 is typically a flash memory cell, but can be any secondary storage device as known in the art, such as magnetic media, EEPROM, optical media, tape, soft or hard disk, or the like.

Accordingly, an embodiment of the invention can include a UE (e.g., UE 300A, 300B, etc.) including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 308, memory 312, API 310 and local database 314 may all be used cooperatively to load, store and execute the various functions disclosed herein and thus the logic to perform these functions may be distributed over various elements. Alternatively, the functionality could be incorporated into one discrete component. Therefore, the features of the UEs 300A and 300B in FIG. 3 are to be considered merely illustrative and the invention is not limited to the illustrated features or arrangement.

The wireless communication between the UEs 300A and/or 300B and the RAN 120 can be based on different technologies, such as CDMA, W-CDMA, time division multiple access (TDMA), frequency division multiple access (FDMA), Orthogonal Frequency Division Multiplexing (OFDM), GSM, or other protocols that may be used in a wireless communications network or a data communications network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Figure 4:
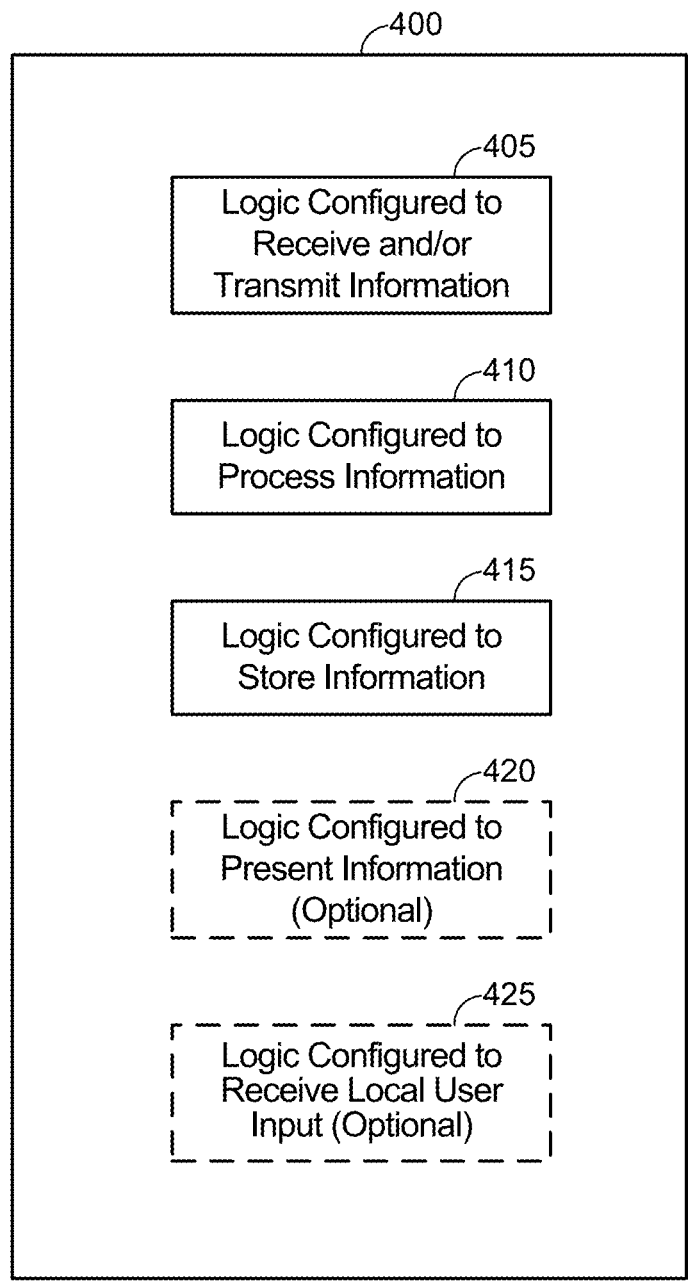
FIG. 4 illustrates a communication device that includes logic configured to perform functionality in accordance with an embodiment of the invention.

FIG. 4 illustrates a communication device 400 that includes logic configured to perform functionality. The communication device 400 can correspond to any of the above-noted communication devices, including but not limited to UEs 300A or 300B, any component of the RAN 120 (e.g., BSs 200A through 210A, BSC 215A, Node Bs 200B through 210B, RNC 215B, eNodeBs 200D through 210D, etc.), any component of the core network 140 (e.g., PCF 220A, PDSN 225A, SGSN 220B, GGSN 225B, MME 215D or 220D, HSS 225D, S-GW 230D, P-GW 235D, PCRF 240D), any components coupled with the core network 140 and/or the Internet 175 (e.g., the application server 170), and so on. Thus, communication device 400 can correspond to any electronic device that is configured to communicate with (or facilitate communication with) one or more other entities over the wireless communications system 100 of FIG. 1.

Referring to FIG. 4, the communication device 400 includes logic configured to receive and/or transmit information 405. In an example, if the communication device 400 corresponds to a wireless communications device (e.g., UE 300A or 300B, one of BSs 200A through 210A, one of Node Bs 200B through 210B, one of eNodeBs 200D through 210D, etc.), the logic configured to receive and/or transmit information 405 can include a wireless communications interface (e.g., Bluetooth, WiFi, 2G, CDMA, W-CDMA, 3G, 4G, LTE, etc.) such as a wireless transceiver and associated hardware (e.g., an RF antenna, a MODEM, a modulator and/or demodulator, etc.). Where the communication device 400 corresponds to a wireless communications device, the logic configured to receive and/or transmit information 405 can include logic configured to receive at least one high priority access barring class and at least one low priority access barring class and/or logic configured to receive an access barring message. In another example, the logic configured to receive and/or transmit information 405 can correspond to a wired communications interface (e.g., a serial connection, a USB or Firewire connection, an Ethernet connection through which the Internet 175 can be accessed, etc.). Thus, if the communication device 400 corresponds to some type of network-based server (e.g., PDSN, SGSN, GGSN, S-GW, P-GW, MME, HSS, PCRF, the application server 170, etc.), the logic configured to receive and/or transmit information 405 can correspond to an Ethernet card, in an example, that connects the network-based server to other communication entities via an Ethernet protocol. Where the communication device 400 corresponds to a network-based server, the logic configured to receive and/or transmit information 405 can include logic configured to receive a call request for a high priority call among a group of client devices, logic configured to transmit a notification to a network instructing it to transmit an access barring message in response to receiving the call request, wherein one or more members of the group of client devices switch to a high priority access class in response to receiving the access barring message, and/or logic configured to suppress call announcements for non-priority call requests after transmitting the notification. In a further example, the logic configured to receive and/or transmit information 405 can include sensory or measurement hardware by which the communication device 400 can monitor its local environment (e.g., an accelerometer, a temperature sensor, a light sensor, an antenna for monitoring local RF signals, etc.). The logic configured to receive and/or transmit information 405 can also include software that, when executed, permits the associated hardware of the logic configured to receive and/or transmit information 405 to perform its reception and/or transmission function(s). However, the logic configured to receive and/or transmit information 405 does not correspond to software alone, and the logic configured to receive and/or transmit information 405 relies at least in part upon hardware to achieve its functionality.

Referring to FIG. 4, the communication device 400 further includes logic configured to process information 410. In an example, the logic configured to process information 410 can include at least a processor. Example implementations of the type of processing that can be performed by the logic configured to process information 410 includes but is not limited to performing determinations, establishing connections, making selections between different information options, performing evaluations related to data, interacting with sensors coupled to the communication device 400 to perform measurement operations, converting information from one format to another (e.g., between different protocols such as .wmv to .avi, etc.), and so on. For example, where the communication device 400 corresponds to a wireless communications device, the logic configured to process information 410 can include logic configured to switch to the low priority access barring class and/or logic configured to switch to the high priority access barring class in response to receiving the access barring message. Where the communication device 400 corresponds to some type of network-based server, the logic configured to process information 410 can include logic configured to suppress call announcements for non-priority call requests after transmitting the notification. The processor included in the logic configured to process information 410 can correspond to a general purpose processor, a digital signal processor (DSP), an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The logic configured to process information 410 can also include software that, when executed, permits the associated hardware of the logic configured to process information 410 to perform its processing function(s). However, the logic configured to process information 410 does not correspond to software alone, and the logic configured to process information 410 relies at least in part upon hardware to achieve its functionality.

Referring to FIG. 4, the communication device 400 further includes logic configured to store information 415. In an example, the logic configured to store information 415 can include at least a non-transitory memory and associated hardware (e.g., a memory controller, etc.). For example, the non-transitory memory included in the logic configured to store information 415 can correspond to RAM memory, flash memory, ROM memory, EPROM memory, EEPROM memory, registers, hard disk, a removable disk, a CD-ROM, or any other form of storage medium known in the art. The logic configured to store information 415 can also include software that, when executed, permits the associated hardware of the logic configured to store information 415 to perform its storage function(s). However, the logic configured to store information 415 does not correspond to software alone, and the logic configured to store information 415 relies at least in part upon hardware to achieve its functionality.

Referring to FIG. 4, the communication device 400 further optionally includes logic configured to present information 420. In an example, the logic configured to present information 420 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 400. For example, if the communication device 400 corresponds to UE 300A or UE 300B as shown in FIG. 3, the logic configured to present information 420 can include the display 310A of UE 300A or the touchscreen display 305B of UE 300B. In a further example, the logic configured to present information 420 can be omitted for certain communication devices, such as network communication devices that do not have a local user (e.g., network switches or routers, remote servers, etc.). The logic configured to present information 420 can also include software that, when executed, permits the associated hardware of the logic configured to present information 420 to perform its presentation function(s). However, the logic configured to present information 420 does not correspond to software alone, and the logic configured to present information 420 relies at least in part upon hardware to achieve its functionality.

Referring to FIG. 4, the communication device 400 further optionally includes logic configured to receive local user input 425. In an example, the logic configured to receive local user input 425 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 400. For example, if the communication device 400 corresponds to UE 300A or UE 300B as shown in FIG. 3, the logic configured to receive local user input 425 can include the keypad 320A, any of the buttons 315A or 310B through 325B, the touchscreen display 305B, etc. In a further example, the logic configured to receive local user input 425 can be omitted for certain communication devices, such as network communication devices that do not have a local user (e.g., network switches or routers, remote servers, etc.). The logic configured to receive local user input 425 can also include software that, when executed, permits the associated hardware of the logic configured to receive local user input 425 to perform its input reception function(s). However, the logic configured to receive local user input 425 does not correspond to software alone, and the logic configured to receive local user input 425 relies at least in part upon hardware to achieve its functionality.

Referring to FIG. 4, while the configured logics of 405 through 425 are shown as separate or distinct blocks in FIG. 4, it will be appreciated that the hardware and/or software by which the respective configured logic performs its functionality can overlap in part. For example, any software used to facilitate the functionality of the configured logics of 405 through 425 can be stored in the non-transitory memory associated with the logic configured to store information 415, such that the configured logics of 405 through 425 each performs their functionality (i.e., in this case, software execution) based in part upon the operation of software stored by the logic configured to store information 415. Likewise, hardware that is directly associated with one of the configured logics can be borrowed or used by other configured logics from time to time. For example, the processor of the logic configured to process information 410 can format data into an appropriate format before being transmitted by the logic configured to receive and/or transmit information 405, such that the logic configured to receive and/or transmit information 405 performs its functionality (i.e., in this case, transmission of data) based in part upon the operation of hardware (i.e., the processor) associated with the logic configured to process information 410.

Generally, unless stated otherwise explicitly, the phrase "logic configured to" as used throughout this disclosure is intended to invoke an embodiment that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the embodiments described below in more detail.

Figure 5:
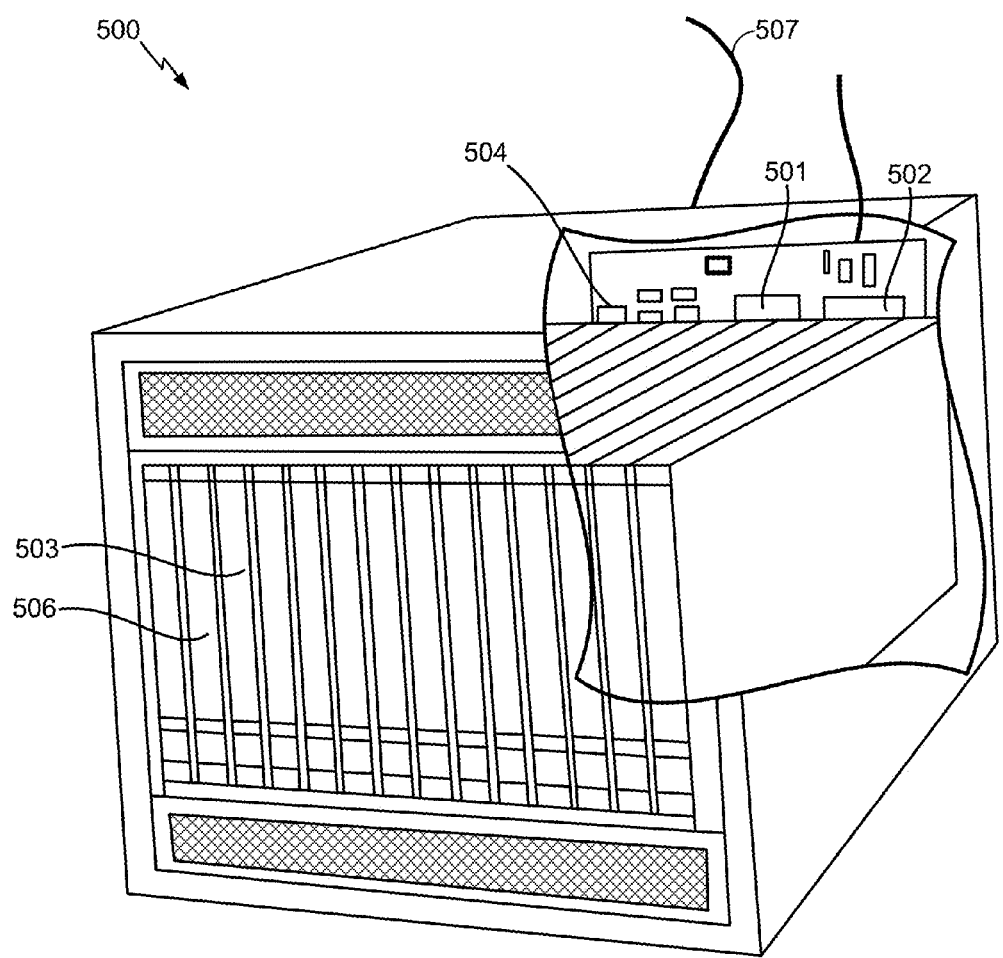
FIG. 5 illustrates an exemplary server according to various aspects of the disclosure.

The various embodiments may be implemented on any of a variety of commercially available server devices, such as server 500 illustrated in FIG. 5. In an example, the server 500 may correspond to one example configuration of the application server 170 described above. In FIG. 5, the server 500 includes a processor 501 coupled to volatile memory 502 and a large capacity nonvolatile memory, such as a disk drive 503. The server 500 may also include a floppy disc drive, compact disc (CD) or DVD disc drive 506 coupled to the processor 501. The server 500 may also include network access ports 504 coupled to the processor 501 for establishing data connections with a network 507, such as a local area network coupled to other broadcast system computers and servers or to the Internet. In context with FIG. 4, it will be appreciated that the server 500 of FIG. 5 illustrates one example implementation of the communication device 400, whereby the logic configured to transmit and/or receive information 405 corresponds to the network access points 504 used by the server 500 to communicate with the network 507, the logic configured to process information 410 corresponds to the processor 501, and the logic configuration to store information 415 corresponds to any combination of the volatile memory 502, the disk drive 503 and/or the disc drive 506. The optional logic configured to present information 420 and the optional logic configured to receive local user input 425 are not shown explicitly in FIG. 5 and may or may not be included therein. Thus, FIG. 5 helps to demonstrate that the communication device 400 may be implemented as a server, in addition to a UE implementation as in 305A or 305B as in FIG. 3.

With conventional network access priority, there is a lack of ability to leverage higher access priority for UE's with dual access priority. For example, it may be desirable for a user to have one access priority during work hours and another access priority during off-work hours. Conventional network access priority solutions also lack UE-originated group priority for unicast calls. Additionally, conventional solutions lack access barring upon commencement of group calls. Further, they lack page/call announcement suppression for non-priority users in cells where access barring is being performed.

As an example, it would be beneficial to allow public safety users to gain priority access when they are off work and use the same device at work and off work. Such a device would need to have dual access classes. To further improve the access barring capability for a targeted group of users out of the set of UEs within the higher access class, such as first responders and public safety users, only the UEs that belong to the advertised group are allowed to perform access. It would also be beneficial to allow call originators with higher priority to initiate access barring in a target area. It would further be beneficial to reduce pages/call announcements for low priority users in the target area to improve the access of high priority UEs.

Figure 6:
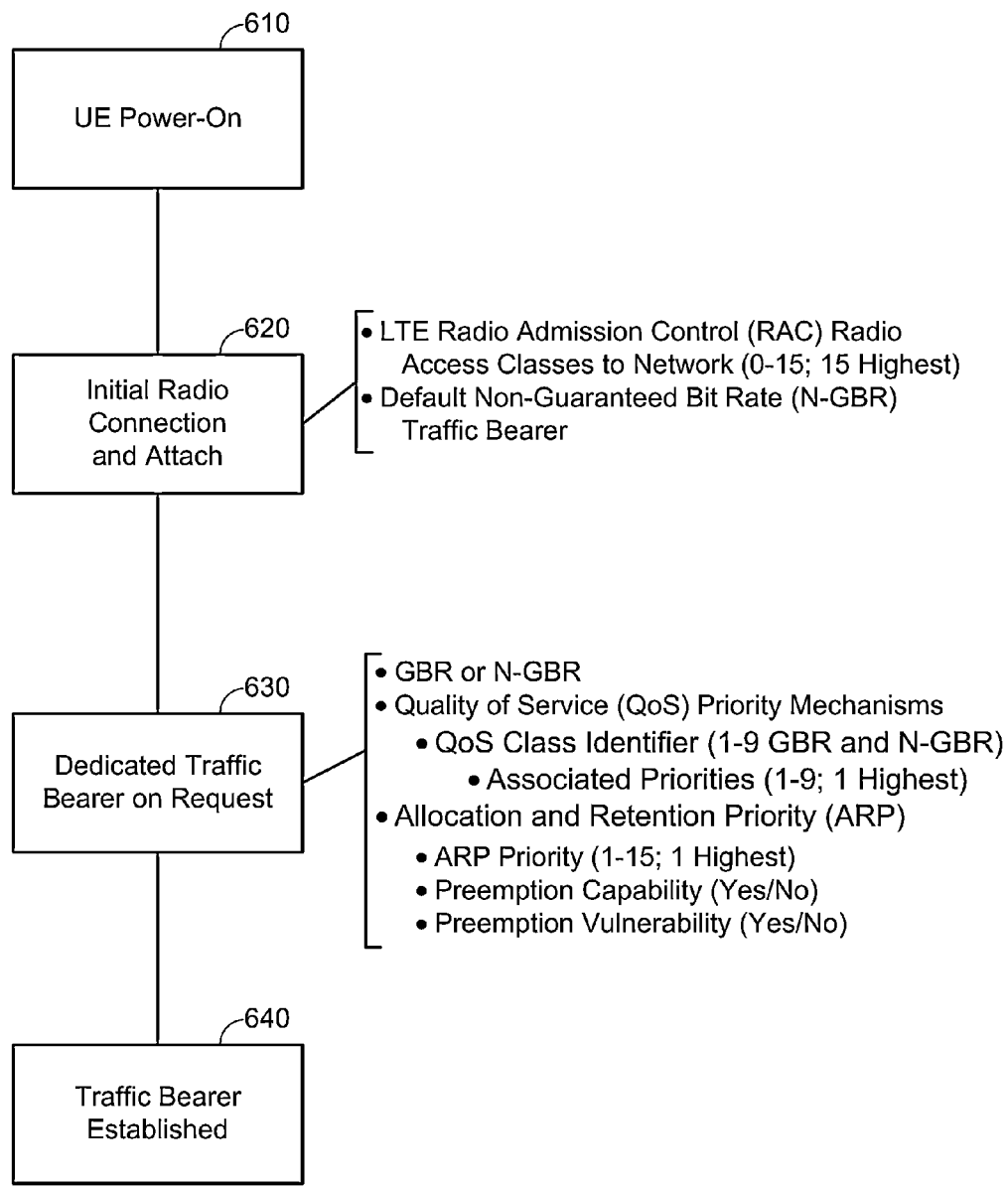
FIG. 6 illustrates an exemplary flow for setting up an application for a high priority user according to at least one aspect of the disclosure.

FIG. 6 illustrates an exemplary flow for setting up an application for a high priority user according to at least one aspect of the disclosure. At 610, the UE is powered on. Next, there are two major steps to setup the application for the high priority user. The first step is radio access (i.e. access to the system, especially in times of congestion) using radio access class barring. At 620, the UE performs an initial radio connection and attach procedure. This includes the LTE radio admission control (RAC) radio access class(es) (0-15) to the network and a default non-guaranteed bit rate (N-GBR) traffic bearer.

The second step is the establishment of an application-oriented traffic bearer (i.e. packet priority allocation) using the QoS class identifier (QCI) and the allocation and retention priority (ARP). At 630, the UE requests a dedicated traffic bearer for the application. This includes a GBR or N-GBR traffic bearer and QoS priority mechanisms, such as the QCI (i.e. 1 to 9 GBR and N-GBR), which has associated priorities 1 to 9, where 1 is the highest. This also includes the ARP priority, which has a value from 1 to 15, where 1 is the highest. The ARP also indicates the preemption capability (yes/no) and the preemption vulnerability (yes/no).

At 640, the traffic bearer is established by the network.

Figure 7:
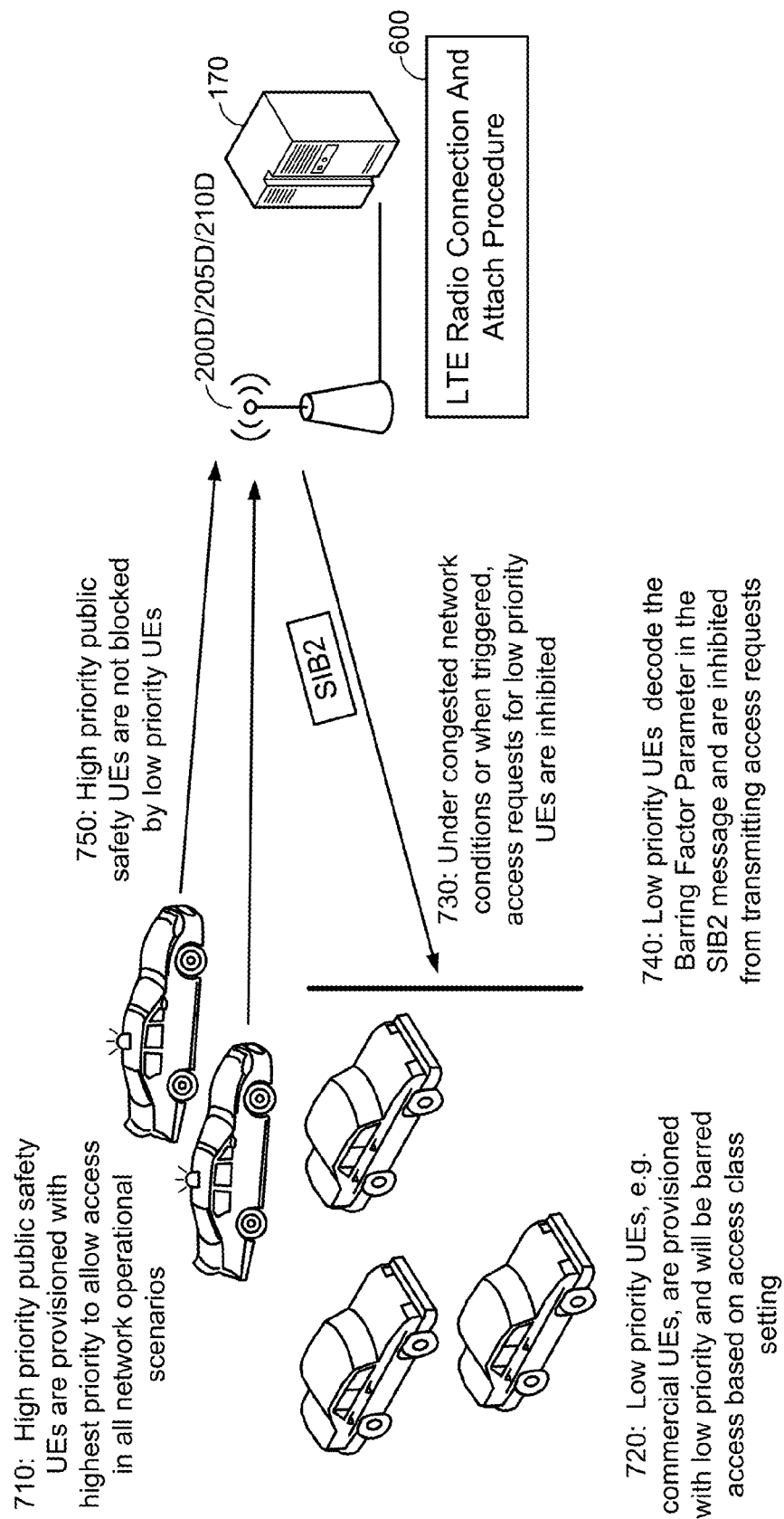
FIG. 7 illustrates an exemplary LTE radio connection and attach procedure for public safety users according to at least one aspect of the disclosure.

FIG. 7 illustrates an exemplary LTE radio connection and attach procedure for public safety users according to at least one aspect of the disclosure. At 710, high priority public safety UEs are provisioned with the highest priority access class to allow them network access in all network operational scenarios. At 720, low priority UEs, such as commercial UEs, are provisioned with a low priority access class and will be barred access based on the access class setting. At 730, under congested network conditions or when triggered, access requests for low priority UEs are inhibited. At 740, low priority UEs decode the Barring Factor Parameter in the SIB2 message and are inhibited from transmitting access requests. At 750, high priority public safety UEs are not blocked by low priority UEs.

However, high priority users may not need and/or should not be provisioned with high priority access at all times. For example, public safety users need high priority access while on duty, but not necessarily when they are off duty. Conventionally, when off duty during an access barring condition, such devices also get priority access, which may not be desirable.

Accordingly, an embodiment provides UEs with dual access priority. Specifically, a UE (on the universal integrated circuit card (UICC)) can be provisioned with two radio access classes, a high priority access class and a low priority access class. For example, public safety users can be provisioned with a high priority access class, such as access class 15, for when they are on duty and a low priority access class, such as access class 2, for when they are off duty. The network sends access barring information in the SIB2 message and the UEs perform access barring based on the SIB2 message reception. The UE uses the higher access class only when the user requires high priority, such as when the user is on-duty for public safety services. For all off duty times, the device only uses a lower access class.

For UE-originated calls, such as a public safety user originating a call, the UE uses the highest access priority assigned to perform access procedures. The UE also notifies the application server 170 using the call signaling messages at the application layer that the call is a high priority call and the participants must be given access priority in a predefined geographic location.

For mobile terminated calls, on receipt of the call signaling, the application server 170 contacts the LTE infrastructure, such as core network 140 in FIG. 2D, to update the SIB2 message in the predefined geographic location to enforce the radio access barring. Once the access barring is broadcasted in the SIB2 message, UEs with the higher access class receive priority access. For UEs with dual access classes, e.g. off duty public safety users, the UE switches from the lower priority access class (e.g. "commercial," with access class 2) to the higher access class (e.g. access class 11) on receipt of the SIB2 message. If the UE is part of the group, the UE receives the page/call announcement and is able to access the network.

For page/call announcement suppression, when access barring is applied to a geographic location, the MME(s) serving the location will suppress UE pages/call announcements for UEs that have a lower access class than the access class of the high priority call.

Figure 8:
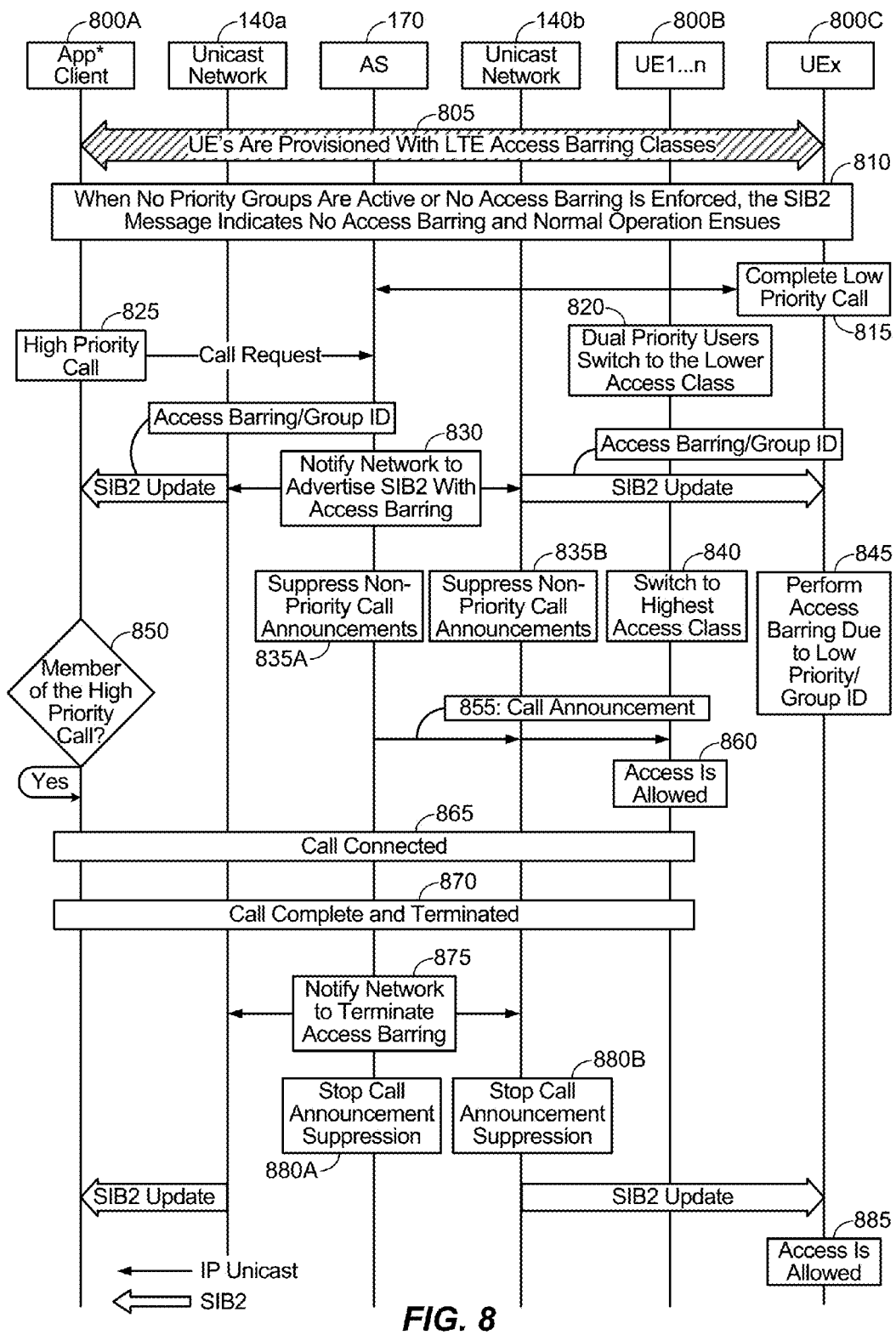
FIG. 8 illustrates an exemplary flow for group priority based access barring according to at least one aspect of the disclosure.

FIG. 8 illustrates an exemplary flow for group priority based access barring according to an aspect of the disclosure. At 805, the UEs, i.e. App* Client 800A, UEs 1 . . . n 800B, and UEx 800C, are provisioned with LTE access barring classes. The term "App*" denotes a high priority GBR application, which is any application that requires GBR QoS on an associated EPS media bearer for supporting its communication sessions (e.g., PTT sessions, VoIP sessions, etc.) and that uses a dedicated access point name (APN), where the dedicated APN is configured to specifically identify the App* to external devices, such as components of the LTE core network 140.

At 810, when no priority groups are active or no access barring is enforced, the SIB2 message indicates no access barring and normal operation ensues. At 815, UEx 800C, which has a high priority access class and a regular/low priority access class, i.e. dual priority, completes a low priority call, i.e. a call with an access class for access procedures of less than 10. The user of UEx 800C may be an off-duty public safety officer, and because the user is off-duty, UEx 800C is in the regular/low priority access class mode.

At 820, a communications group of dual priority users, represented as UEs1 . . . n 800B, switch to their lower access classes, either based on time, a network event, and/or user action. For example, if the users of UEs1 . . . n 800B are public safety officers, UEs1 . . . n 800B may switch to their lower access classes when the users go off-duty. This switch may be based on the time of day corresponding to the end of the users' shifts or to direct user interaction, such as manual priority mode selection.

At 825, App* Client 800A initiates a high priority call to the communications group represented as UEs1 . . . n 800B and transmits the call request to the application server 170, indicating that the call requires high priority access. At 830, the application server 170 receives the high priority call request. Based on the priority policy, the application server 170 determines that the call requires priority access and notifies the core networks associated with UEs 800A-C, i.e. unicast networks 140a and 140b, to advertise the SIB2 message with access barring. Alternatively, the SIB2 message can also contain group identification information. In response, unicast networks 140a and 140b transmit the access barring SIB2 message to the UEs 800A-C.

At 835A, the application server 170 suppresses non-priority call announcements. At 835B, in response to receiving the notification from the application server 170, the unicast network 140b also suppresses non-priority call announcements, independently of the application server 170 suppressing non-priority call announcements at 835A. At 840, in response to receiving the updated SIB2 message from the unicast network 140b, dual priority UEs1 . . . n 800B switch to their highest available priority access class. At 845, low priority UEs or UEs that are not members of the high priority group, such as UEx 800C, perform access barring in response to receiving the SIB2 message.

At 850, the App* Client 800A determines whether it is a member of the high priority call, which it is. At 855, the application server 170 sends the call announcement to the communications group of UEs1 . . . n 800B. At 860, because the dual priority UEs1 . . . n 800B have a priority access class at least as high as the priority access class of the high priority call and/or they are members of the high priority group, they are permitted to access the network.

At 865, the call is connected between App* Client 800A and UEs1 . . . n 800B. At 870, the call is completed and terminated. At 875, the application server 170 notifies unicast networks 140a and 140b to terminate access barring. In response, unicast networks 140a and 140b transmit an updated SIB2 message. At 880A, the application server 170 stops suppressing call announcements, and at 880B, the unicast network 140b also stops suppressing call announcements, independently of the application server 170. At 885, UEx 800C is allowed to access the network again.

Figure 9:
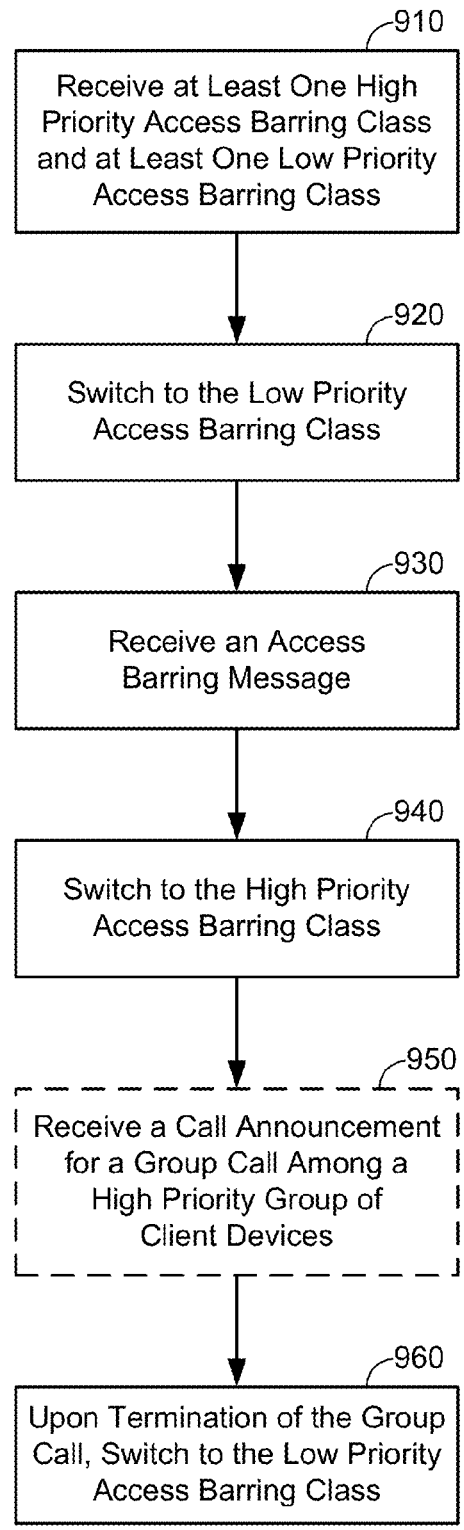
FIG. 9 illustrates an exemplary flow for determining priority access with dual access barring classes according to at least one aspect of the disclosure.

FIG. 9 illustrates an exemplary flow for determining priority access with dual access barring classes. The flow illustrated in FIG. 9 may be performed by a client device/UE, such as UE 300A, 300B, 400, 800A, 800B, or 800C.

At 910, the client device receives at least one high priority access barring class and at least one low priority access barring class. The high and low priority access barring classes may be provisioned by a server, such as application server 170, the RAN, such as RAN 120, the network, such as core network 140, the network administrator, the manufacturer of the client device, or the like. At 920, the client device switches to the low priority access barring class. The client device may switch to the low priority access barring class based on a time of day, a network event, and/or user action.

At 930, the client device receives an access barring message. A server, such as application server 170, transmits a notification to a network, such as unicast network 140a and/or 140b in FIG. 8, instructing it/them to transmit the access barring message in response to receiving a high priority call request. The access barring message may be a bitmask indicating a group of client devices permitted to access the network. The access barring message may be a SIB2 message. After transmitting the notification, the server suppresses call announcements for non-priority call requests. After receiving the notification, the network suppresses call announcements for non-priority call requests. The network may be a unicast network.

At 940, in response to receiving the access barring message, the client device switches to the high priority access barring class. Although the client device switches to its high priority access barring class, it may not be able to access the network if the access barring message indicates a higher access barring class than the client device's high priority access barring class. At 950, the client device receives a call announcement for a group call among a high priority group of client devices. Block 950 is optional, as the client device may not be part of the group call.

At 960, the client device switches to the low priority access barring class upon termination of the group call. The server may transmit a notification to the network instructing it to terminate access barring in response to termination of the group call among the high priority group of client devices. The server may stop suppressing call announcements for non-priority call requests after transmitting the notification. The network may stop suppressing call announcements for non-priority call requests after receiving the notification.

Figure 10:
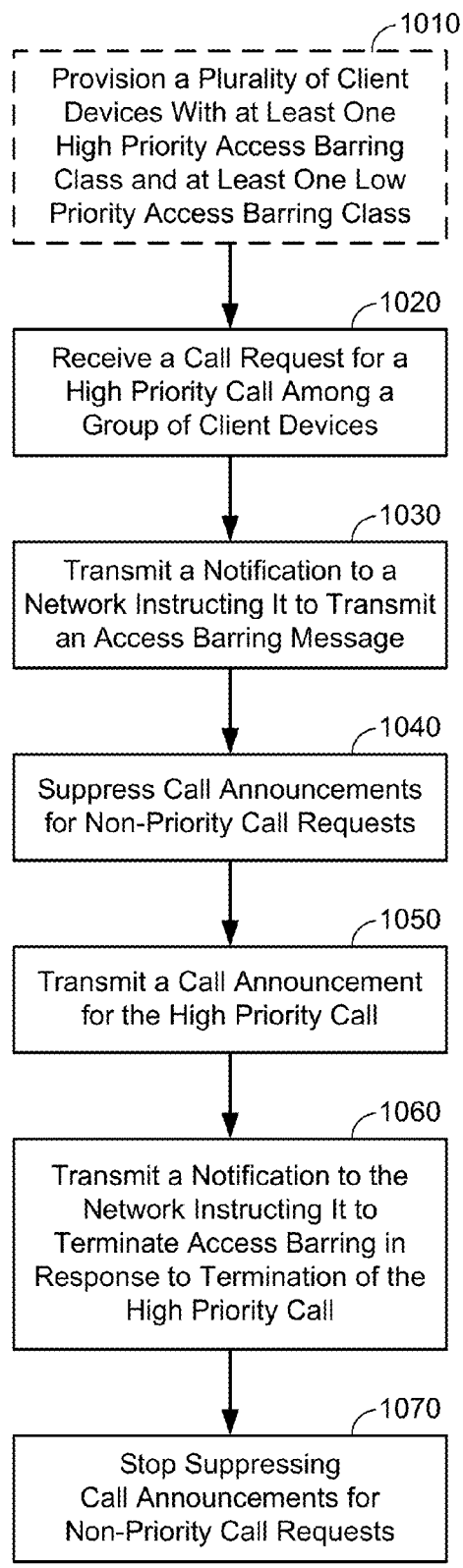
FIG. 10 illustrates an exemplary flow for determining priority access with dual access barring classes according to at least one aspect of the disclosure.

FIG. 10 illustrates an exemplary flow for determining priority access with dual access barring classes. The flow of FIG. 10 may be performed by a server, such as application server 170.

At 1010, the server provisions a plurality of client devices with at least one high priority access barring class and at least one low priority access barring class. Block 1010 is optional, as the access barring classes may alternatively be provisioned by the RAN, such as RAN 120, a network, such as core network 140, the network administrator, the manufacturer of the client device, or the like. The plurality of client devices may switch to the low priority access barring class in response to the provisioning. The plurality of client devices may switch to the low priority access barring class based on a time of day, a network event, and/or user action.

At 1020, the server receives a call request for a high priority call among a group of client devices.

At 1030, in response to receiving the call request, the server transmits a notification to the network instructing it to transmit an access barring message, where one or more members of the group of client devices may switch to a high priority access class in response to receiving the access barring message. The access barring message comprises a bitmask indicating that the group of client devices is permitted to access the network. The network suppresses call announcements for non-priority call requests after receiving the notification. The network may be a unicast network, such as unicast network 140a or 140b in FIG. 8. The access barring message may be a bitmask indicating a group of client devices permitted to access the network. The access barring message may be a system information block type 2 (SIB2) message.

At 1040, the server suppresses call announcements for non-priority call requests after transmitting the notification. At 1050, the server transmits a call announcement for the high priority call. At 1060, the server transmits a notification to the network instructing it to terminate access barring in response to termination of the high priority call. At 1070, the server stops suppressing call announcements for non-priority call requests after transmitting the notification. The network may stop suppressing call announcements for non-priority call requests after receiving the notification.

While the embodiments above have been described primarily with reference to 1×EV-DO architecture in CDMA2000 networks, GPRS architecture in W-CDMA or UMTS networks and/or EPS architecture in LTE-based networks, it will be appreciated that other embodiments can be directed to other types of network architectures and/or protocols.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method for determining priority access with dual access barring classes, comprising:
   receiving, at a server, a call request for a high priority call among a group of client devices;
   transmitting a notification to a network instructing the network to transmit an access barring message in response to receiving the call request, wherein one or more members of the group of client devices switch to a high priority access class in response to receiving the access barring message; and
   suppressing call announcements for non-priority call requests after transmitting the notification.

2. The method of claim 1, wherein the access barring message comprises a bitmask indicating that the group of client devices is permitted to access the network.

3. The method of claim 1, further comprising:
   provisioning a plurality of client devices with at least one high priority access barring class and at least one low priority access barring class.

4. The method of claim 3, wherein the plurality of client devices switch to the at least one low priority access barring class in response to the provisioning.

5. The method of claim 4, wherein the switching to the at least one low priority access barring class is based on a time of day, a network event, and/or user action.

6. The method of claim 1, wherein the network suppresses the call announcements for non-priority call requests after receiving the notification.

7. The method of claim 1, wherein the network comprises a unicast network.

8. The method of claim 1, wherein the access barring message comprises a bitmask indicating a group of client devices permitted to access the network.

9. The method of claim 1, wherein the access barring message comprises a system information block type 2 (SIB2) message.

10. The method of claim 1, further comprising:
    transmitting a call announcement for the high priority call.

11. The method of claim 1, further comprising:
    transmitting a notification to the network instructing the network to terminate access barring in response to termination of the high priority call.

12. The method of claim 11, further comprising:
    stopping the suppressing of the call announcements for non-priority call requests after transmitting the notification.

13. The method of claim 11, wherein the network stops suppressing the call announcements for non-priority call requests after receiving the notification.

14. An apparatus for determining priority access with dual access barring classes, comprising:
    a network interface configured to receive a call request for a high priority call among a group of client devices; and
    at least one processor configured to:
       cause the network interface to transmit a notification to a network that instructs the network to transmit an access barring message in response to reception of the call request, wherein one or more members of the group of client devices switch to a high priority access class in response to reception of the access barring message; and
       suppress call announcements for non-priority call requests after transmission of the notification.

15. The apparatus of claim 14, wherein the access barring message comprises a bitmask indicating that the group of client devices is permitted to access the network.

16. The apparatus of claim 14, wherein the at least one processor is further configured to:
    cause the network interface to provision a plurality of client devices with at least one high priority access barring class and at least one low priority access barring class.

17. The apparatus of claim 16, wherein the plurality of client devices switch to the at least one low priority access barring class in response to the provisioning.

18. The apparatus of claim 17, wherein the plurality of client devices switch to the at least one low priority access barring class based on a time of day, a network event, and/or user action.

19. The apparatus of claim 14, wherein the network suppresses the call announcements for non-priority call requests after reception of the notification.

20. The apparatus of claim 14, wherein the network comprises a unicast network.

21. The apparatus of claim 14, wherein the access barring message comprises a bitmask indicating a group of client devices permitted to access the network.

22. The apparatus of claim 14, wherein the access barring message comprises a system information block type 2 (SIB2) message.

23. The apparatus of claim 14, wherein the at least one processor is further configured to:
cause the network interface to transmit a call announcement for the high priority call.

24. The apparatus of claim 14, wherein the at least one processor is further configured to:
cause the network interface to transmit a notification to the network that instructs the network to terminate access barring in response to termination of the high priority call.

25. The apparatus of claim 24, wherein the at least one processor is further configured to:
stop the suppression of the call announcements for non-priority call requests after transmission of the notification.

26. The apparatus of claim 24, wherein the network stops suppression of the call announcements for non-priority call requests after reception of the notification.

27. An apparatus for determining priority access with dual access barring classes, comprising:
a communication means for receiving a call request for a high priority call among a group of client devices; and
a processing means for:
causing the communication means to transmit a notification to a network that instructs the network to transmit an access barring message in response to reception of the call request, wherein one or more members of the group of client devices switch to a high priority access class in response to reception of the access barring message; and
suppressing call announcements for non-priority call requests after transmitting the notification.

28. A non-transitory computer-readable medium for determining priority access with dual access barring classes, comprising:
at least one instruction to cause a server to receive a call request for a high priority call among a group of client devices;
at least one instruction to cause the server to transmit a notification to a network that instructs the network to transmit an access barring message in response to reception of the call request, wherein one or more members of the group of client devices switch to a high priority access class in response to reception of the access barring message; and
at least one instruction to cause the server to suppress call announcements for non-priority call requests after transmission of the notification.

* * * * *